US012081009B2

(12) United States Patent
Bouchard

(10) Patent No.: US 12,081,009 B2
(45) Date of Patent: Sep. 3, 2024

(54) AUTONOMOUS CABLE LASHER COMPRISING AN ONBOARD TORQUE COMPENSATION MECHANISM

(71) Applicant: ELECTRO SAGUENAY LTÉE, Alma (CA)

(72) Inventor: Guillaume Bouchard, Alma (CA)

(73) Assignee: ELECTRO SAGUENAY LTÉE, Alma (CA)

(*) Notice: Subject to any disclaimer, the term of this patent is extended or adjusted under 35 U.S.C. 154(b) by 691 days.

(21) Appl. No.: 17/196,304

(22) Filed: Mar. 9, 2021

(65) Prior Publication Data
US 2022/0294202 A1 Sep. 15, 2022

(51) Int. Cl.
*H02G 7/10* (2006.01)

(52) U.S. Cl.
CPC ..................... *H02G 7/10* (2013.01)

(58) Field of Classification Search
CPC .. H02G 7/00; H02G 7/10; H02G 1/02; H02G 1/04; H02G 1/06; G02B 6/486
USPC .................................. 254/134.3 CL
See application file for complete search history.

(56) References Cited

U.S. PATENT DOCUMENTS

| 2,290,152 | A | * | 7/1942 | Andrews | G03D 13/06 |
| | | | | | 396/623 |
| 3,141,630 | A | | 7/1964 | Eitel | |
| 3,174,725 | A | | 3/1965 | Pfundt | |
| 3,259,370 | A | * | 7/1966 | Neale, Sr. | H02G 7/10 |
| | | | | | 254/134.3 CL |
| 3,789,594 | A | | 2/1974 | Rees | |
| 4,014,516 | A | | 3/1977 | Jacks | |
| 4,713,866 | A | | 12/1987 | Goldmann et al. | |

(Continued)

FOREIGN PATENT DOCUMENTS

| CA | 484957 A | 7/1952 |
| CA | 504712 A | 7/1954 |

(Continued)

OTHER PUBLICATIONS

WO-2007031506-A2 translation (Year: 2007).*

*Primary Examiner* — Abbie E Quann
(74) *Attorney, Agent, or Firm* — Jacob M. Ward; Ward Law Office LLC

(57) ABSTRACT

The cable lasher comprises an autonomous carriage for moving along cables to be attached to each other, a lashing apparatus rotatably mounted to the carriage and capable of dispensing a lashing wire about the cables in a helical winding pattern as the cable lasher moves along a longitudinal axis and the lashing apparatus rotates to attach the cables to each other. The cable lasher also comprises a channel for receiving the cables, about which the carriage and the lashing apparatus are disposed and extending along the longitudinal axis, a lashing apparatus actuator carried by the frame that rotates the lashing apparatus when the cable lasher moves along the longitudinal axis, and an onboard power source carried by said carriage for powering the advance of the carriage and the rotation of the lashing apparatus. The cable lasher further comprises an onboard torque compensation mechanism acting on the autonomously movable carriage to apply a force for at least partly countering a lashing wire torque applied thereon through the lashing apparatus by the lashing wire being wound about the cables.

16 Claims, 25 Drawing Sheets

(56) References Cited

U.S. PATENT DOCUMENTS

| | | |
|---|---|---|
| 4,904,996 A | 2/1990 | Fernandes |
| 5,217,207 A | 6/1993 | Schmader et al. |
| 5,295,664 A | 3/1994 | Kamper |
| 5,522,584 A | 6/1996 | Kononov et al. |
| 5,611,521 A | 3/1997 | Grover et al. |
| 5,727,373 A | 3/1998 | Appleford et al. |
| 5,826,859 A | 10/1998 | Kononov et al. |
| 5,901,435 A | 5/1999 | Vallee |
| 6,032,449 A | 3/2000 | Einsle et al. |
| 6,062,542 A | 5/2000 | Delaney et al. |
| 6,199,829 B1 | 3/2001 | Brown et al. |
| 6,398,189 B1 | 6/2002 | Delaney et al. |
| 6,494,141 B2 | 12/2002 | Montambault et al. |
| 6,540,207 B1 | 4/2003 | Barnes |
| 6,805,333 B2 | 10/2004 | Delaney et al. |
| 7,352,936 B2 | 4/2008 | Sales I Casals |
| 8,282,080 B2 | 10/2012 | Ballard |
| 8,660,698 B2 | 2/2014 | Phillips et al. |
| 8,666,553 B2 | 3/2014 | Phillips et al. |
| 8,697,178 B2 | 4/2014 | Boué |
| 9,742,165 B2 | 8/2017 | Hyde et al. |
| 10,461,512 B2 | 10/2019 | Temple et al. |

FOREIGN PATENT DOCUMENTS

| | | | |
|---|---|---|---|
| CA | 543785 A | 7/1957 | |
| CA | 558122 A | 5/1958 | |
| CA | 795657 A | 10/1968 | |
| CA | 801586 A | 12/1968 | |
| CA | 1009439 A | 5/1977 | |
| CA | 2030498 A1 | 10/1991 | |
| CA | 2131064 A | 3/1995 | |
| CN | 109586207 A | 4/2019 | |
| DE | 3313431 A1 | 10/1984 | |
| EP | 1172675 A2 | 1/2002 | |
| WO | WO-2007031506 A2 * | 3/2007 | ............ G02B 6/486 |
| WO | 2019132674 A1 | 7/2019 | |

\* cited by examiner

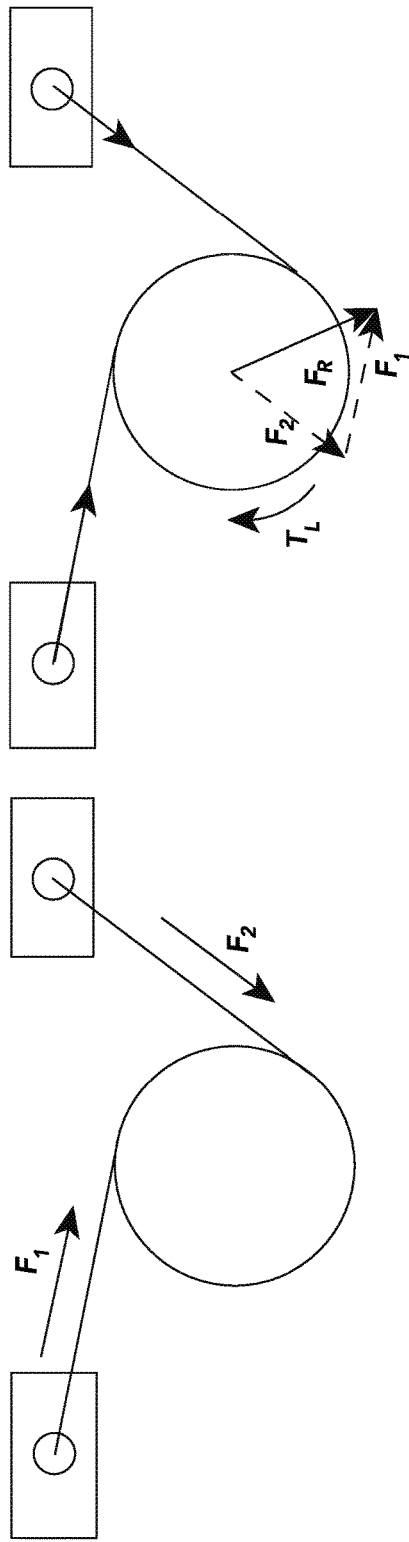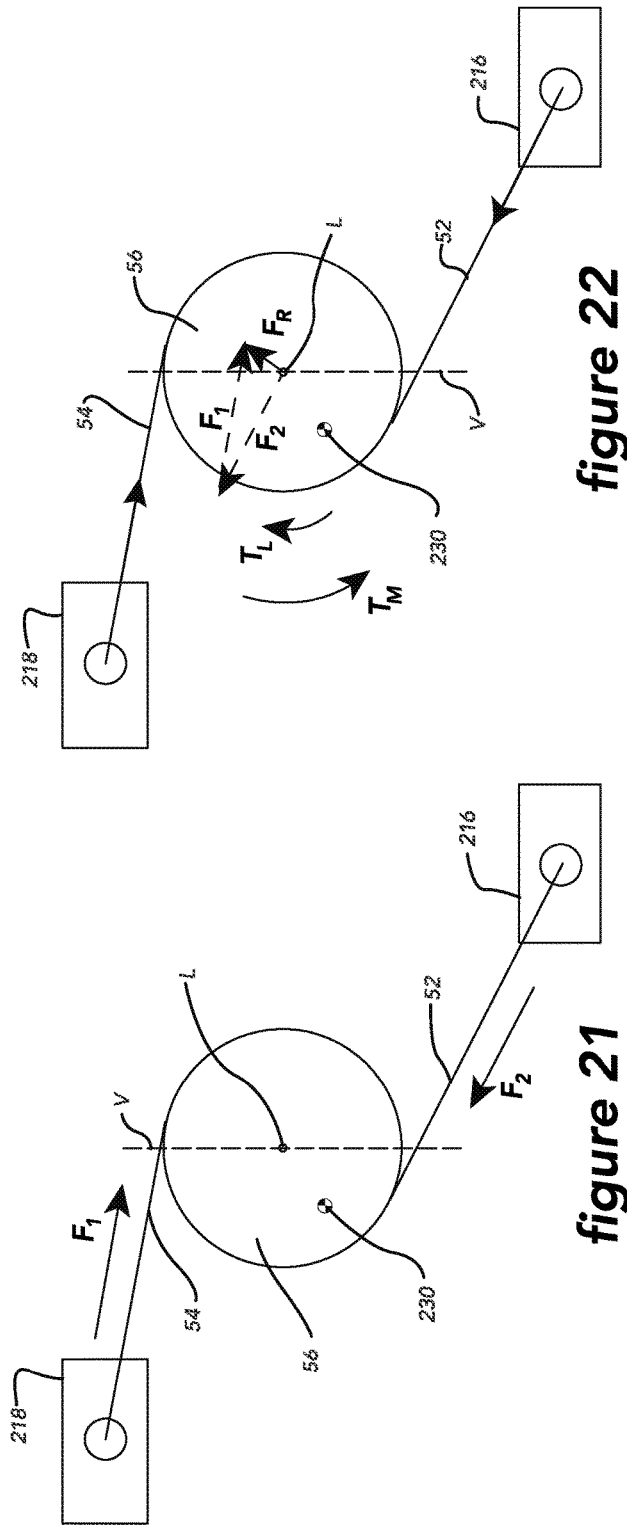

AUTONOMOUS CABLE LASHER COMPRISING AN ONBOARD TORQUE COMPENSATION MECHANISM

FIELD OF THE INVENTION

The present invention relates attaching to cable lashers for winding lashing wire around utility and carrier cables to attach them to each other.

BACKGROUND OF THE INVENTION

Utility cables include for example electricity cables used to convey electricity and telecommunication cables used to convey telecommunication signals such as internet or phone signals. Although some utility cables are installed underground, the present invention is interested in those that are carried by, and extend between, utility poles that are upstanding on the ground. To prevent the utility cables from sagging between each pair of successive utility poles, a carrier cable, made of metallic strands, is tensioned between the utility poles and the utility cables are attached to the carrier cable with lashing wire. The lashing wire can be for example a thick metallic or plastic wire.

To attach the utility cables to the carrier cable, it is known to use a cable lasher that rides the carrier cable, that will dispense lashing wire in a helical pattern about the utility and carrier cables to form a tightly lashed cable bundle. More specifically, the cable lasher comprises a carriage portion that comprises a frame that has guide wheels that can roll on the carrier cable. A lashing tool is attached to the carriage frame. The lashing tool has a rotatable frame that rotates around the utility and carrier cables as the carriage advances along the cables. Two magazines (although some models only have a single magazine) of lashing wire are carried by the lashing tool frame, each storing a reserve of lashing wire. One extremity of each of the two lashing wires extends out of the drum and is attached to the carrier cable by means of a dedicated wire attachment clamp.

In use, a lead wire is attached to the carriage frame and downwardly depends therefrom towards the ground. A worker standing on the ground can pull on the lead wire to force the carriage to move along the utility and carrier cables. As the carriage advances, the drum is brought into rotational movement by a transfer mechanism linking the guide wheels with the lashing tool frame. Due to the combined rotational and linear movements of the lashing tool frame along the cables, the two lashing wires will be pulled out of their magazines and will be dispensed about the group of cables. More particularly, the lashing wires will both be dispensed in a helical winding pattern about the cables, each turn spaced from the others, and the tension in the lashing wires will force the cables together to form a tightly lashed bundle of cables.

While this product works well, it has some drawbacks, one of them being that it requires a person standing on the ground to pull on the lead wire to move the cable lasher along the wires. This can be made complex due to terrain under the utility poles, including vegetation. Furthermore, obstacles such as vegetation can sometimes come in the way of the lead line itself, hindering the advance. Also, pulling the carriage from the ground, considering that some cables to be lashed can be high over ground, and that the lashing wires need to be taut about the group of cables, can be tiring for the worker.

Apart from the challenges that relate to displacement of the cable lasher, known cable lashers also have inherent construction problems that relate to them being designed for being pulled from the ground. Namely, the lashing wires that are dispensed in helical pattern will apply a torque on the cable lasher frame that force it to rotate about the group of cables. This rotation is countered, and the cable lasher is partly stabilized, by the lead wire being pulled downwardly by the worker. So while this is not a major problem with manually pulled cable lashers, if the cable lasher were to be autonomous without the lead line to stabilize it, the torque applied by the lashing wires would force the cable lasher frame to rotate about the group of cables, and this would destabilize the cable lasher as it moves forward.

Additionally, the known manually pulled cable lashers have their lashing wires dispensed on a same side relative to the group of cables. This destabilizes the cable lasher, since there will be a significant resultant radial component of the force applied by the lashing wires on the cable lasher frame (see FIGS. 19 and 20 of the drawings, discussed further hereinafter), and since the lashing tool rotates about the group of cables, this resultant radial force component will continuously rotate about the group of cables. Having a worker pull on a lead wire from the ground helps to counter this rotatable radial force effect, but only partly; the cable lasher will still swing as it moves along the group of cables and the cable lasher dispensers rotate about the group of cables.

SUMMARY OF THE INVENTION

The present invention consequently generally relates to a cable lasher that improves on the prior art cable lashers; and specifically aims at enabling an autonomous cable lasher that does not require the intervention of a ground worker to pull the cable lasher along the cables being attached to each other.

More specifically, the present invention relates to an autonomous cable lasher for winding a first lashing wire around a number of cables to attach the cables to each other, comprising:
  a carriage defining a longitudinal axis, the carriage for riding at least one of the cables in a direction that is generally aligned with the longitudinal axis, comprising:
    a carriage frame;
    a drive mechanism carried by the carriage frame, for autonomously driving the carriage frame along the at least one of the cables;
    a power source for powering the drive mechanism; and
    a drive controller that controls the drive mechanism;
  a lashing apparatus comprising:
    a lashing apparatus frame rotatably mounted to the carriage frame and rotatable about the longitudinal axis relative to the carriage frame;
    a first magazine carried by the lashing apparatus frame, for carrying a reserve of the first lashing wire therein; and
    a first dispenser carried by the lashing apparatus frame, for dispending the first lashing wire from the first magazine about the cables in a helical winding pattern as the cable lasher moves along the longitudinal axis and the lashing apparatus frame rotates, to attach the cables to each other;
  a channel for receiving the cables, about which the carriage frame and the lashing apparatus frame are disposed and extending along the longitudinal axis;

a lashing apparatus actuator that rotates the lashing apparatus frame relative to the carriage frame when the cable lasher moves along the longitudinal axis; and an onboard torque compensation mechanism acting on the autonomously movable frame to apply a force for at least partly countering a lashing wire torque applied thereon through the lashing apparatus by the first lashing wire being wound about the cables.

In one embodiment, the cable lasher defines a center of mass and the onboard torque compensation mechanism comprises an offset position of the center of mass relative to the longitudinal axis that will, through gravity, induce a center of mass torque about the longitudinal axis in a direction that is opposite to the lashing wire torque.

In one embodiment, the carriage defines a vertical orientation that represents an average expected alignment of the carriage with a vertical plane extending through the longitudinal axis, with the center of mass further being located to one side of the vertical plane when the carriage is in the vertical orientation.

In one embodiment, the center of mass is further below under a horizontal plane extending through the frame's longitudinal axis when the carriage is in the vertical orientation.

In one embodiment, the autonomous drive mechanism comprises at least one drive wheel rotatably mounted to the carriage frame for engaging the at least one of the cables, and a motor carried by the carriage frame for rotating the drive wheel.

In one embodiment, the drive controller comprises a remote controller capable of wireless transmission with a transceiver carried by the carriage frame and connected to the motor.

In one embodiment, the power source comprises batteries carried by the frame for powering the motor.

In one embodiment, the lashing apparatus further comprises:

a second magazine carried by the lashing apparatus frame, for carrying a reserve of a second lashing wire therein; and a second dispenser for dispending the second lashing wire from the second magazine about the cables in a helical winding pattern as the cable lasher moves along the longitudinal axis and the lashing apparatus frame rotates to further attach, together with the first wire, the cables to each other;

wherein the onboard torque compensation mechanism acting on the autonomously movable carriage frame is for countering the lashing wire torque which is applied thereon through the lashing apparatus by both the first and second lashing wires being wound about the cables.

In one embodiment, the cable lasher as defined in claim 1, wherein the lashing apparatus comprises a spool carrying a coil comprising a reserve of the lashing wire, the spool being rotatably mounted to the lashing wire frame.

In one embodiment, the lashing apparatus comprises a spool brake for restricting, but not preventing, the rotation of the spool.

In one embodiment, the magazine comprises ribs for helping to prevent the lashing wire from accidentally sliding through the coil towards a rotational axis of the spool.

In one embodiment, the lashing apparatus frame is rotatably mounted to the carriage frame by means of a mount interface that comprises at least one rail fixed to one of the lashing apparatus frame and the carriage frame, and a group of bearings fixed to the other one of the lashing apparatus frame and the carriage frame, with the group of bearings engaging the at least one rail for mounting the lashing apparatus frame to the carriage frame while allowing rotation of the lashing apparatus frame relative to the carriage frame.

In one embodiment, the at least one rail comprises a first rail and a second rail, and the group of bearings comprises:

first bearings that have a flat, cylindrical outer surface that flatly engages the first rail, thus helping to maintain a stable radial engagement of the lashing apparatus frame on the carriage frame; and second bearings, with the second bearings and the second rail respectively having first and second complementary groove and rib members, thus helping to maintain a stable axial engagement of the lashing apparatus frame relative to the carriage frame.

The present invention also relates to an autonomous cable lasher for winding at least two lashing wires around a number of cables to attach them to each other, comprising:

a carriage defining a longitudinal axis, the carriage for riding at least one of the cables in a direction that is generally aligned with the longitudinal axis, comprising:

a carriage frame;

a drive mechanism carried by the carriage frame, for autonomously driving the carriage frame along the at least one of the cables;

a power source for powering the drive mechanism; and a drive controller that controls the drive mechanism;

a low mass lashing apparatus comprising:

a lashing apparatus frame rotatably mounted to the carriage frame and rotatable about the longitudinal axis relative to the carriage frame;

at least one lashing wire magazine carried by the lashing apparatus, for carrying a reserve of the at least two wires therein; and at least two lashing wire dispensers each for dispensing a corresponding one of the at least two lashing wires from the at least one magazine about the cables in a helical winding pattern as the cable lasher moves along the longitudinal axis and the lashing apparatus rotates to attach the cables to each other;

a channel for receiving the cables, about which the carriage and the lashing apparatus are disposed and extending along the longitudinal axis; and a lashing apparatus actuator carried by the carriage frame, that rotates the lashing apparatus frame when the cable lasher moves along the longitudinal axis;

wherein the lashing apparatus actuator actuates the lashing apparatus frame directly without acting on the at least two lashing wire dispensers, and wherein the at least two wire lashing wire dispensers are disposed about the longitudinal axis for having the at least two lashing wires dispensed thereby apply a radial resultant force component on the carriage frame through the lashing apparatus frame that is less than each of the individual radial force components applied by the two lashing wires.

In one embodiment, the at least two lashing wire dispensers are disposed at generally equiangular positions about the longitudinal axis.

In one embodiment, the at least two lashing wires include a first and a second lashing wires; the at least two lashing wire magazines comprise a first and a second lashing wire magazines for respectively carrying a reserve of the first and the second lashing wires therein; the at least two lashing wire dispensers comprise a first and a second lashing wire dispensers respectively dispending the first and the second lashing wires from the first and second magazines about the cables, with the first and second lashing wire dispensers being disposed at approximately 180° angles about the longitudinal axis relative to one another.

In one embodiment, each of the at least two lashing wire dispensers comprise sets of one or more wire guiding rollers.

The invention also relates to a cable lasher comprising:
an autonomous carriage for moving along cables to be attached to each other;
a lashing apparatus rotatably mounted to the carriage and capable of dispensing a lashing wire about the cables in a helical winding pattern as the cable lasher moves along a longitudinal axis and the lashing apparatus rotates to attach the cables to each other;
a channel for receiving the cables, about which the carriage and the lashing apparatus are disposed and extending along the longitudinal axis;
a lashing apparatus actuator carried by the frame that rotates the lashing apparatus when the cable lasher moves along the longitudinal axis;
an onboard power source carried by said carriage for powering the advance of the carriage and the rotation of the lashing apparatus; and
an onboard torque compensation mechanism acting on the autonomously movable carriage to apply a force for at least partly countering a lashing wire torque applied thereon through the lashing apparatus by the lashing wire being wound about the cables.

The invention further relates to a cable lasher comprising:
an autonomous carriage for moving along cables to be attached to each other;
a low mass lashing apparatus rotatably mounted to the carriage;
at least two lashing wire dispensers carried by the lashing apparatus that each dispense a lashing wire about the cables in a helical winding pattern as the cable lasher moves along a longitudinal axis and the lashing apparatus rotates to attach the cables to each other;
a channel for receiving the cables, about which the carriage and the lashing apparatus are disposed and extending along the longitudinal axis;
a lashing apparatus actuator carried by the frame that rotates the lashing apparatus when the cable lasher moves along the longitudinal axis;
an onboard power source carried by said carriage for powering the advance of the carriage and the rotation of the lashing apparatus.
wherein the lashing apparatus actuator actuates the lashing apparatus frame directly without acting on the at least two lashing wire dispensers, and wherein the at least two wire lashing wire dispensers are disposed about the longitudinal axis in such a way to have the lashing wires dispensed thereby apply a radial resultant force component on the carriage through the lashing apparatus that is less than each of the individual radial force components applied by the two lashing wires.

DESCRIPTION OF THE DRAWINGS

In the Annexed Drawings:
FIGS. 19 and 20 are schematic rear elevations, according to the prior art, showing the lashing wire dispensers, the lashing wires and a group of cables, to illustrate the forces imparted to the cable lasher by the lashing wires;
FIGS. 21 and 22 are respectively similar to FIGS. 19 and 20, but show the lashing wire dispensers and lashing wires disposed according to the present invention.

DETAILED DESCRIPTION OF THE EMBODIMENTS

Figure 1:
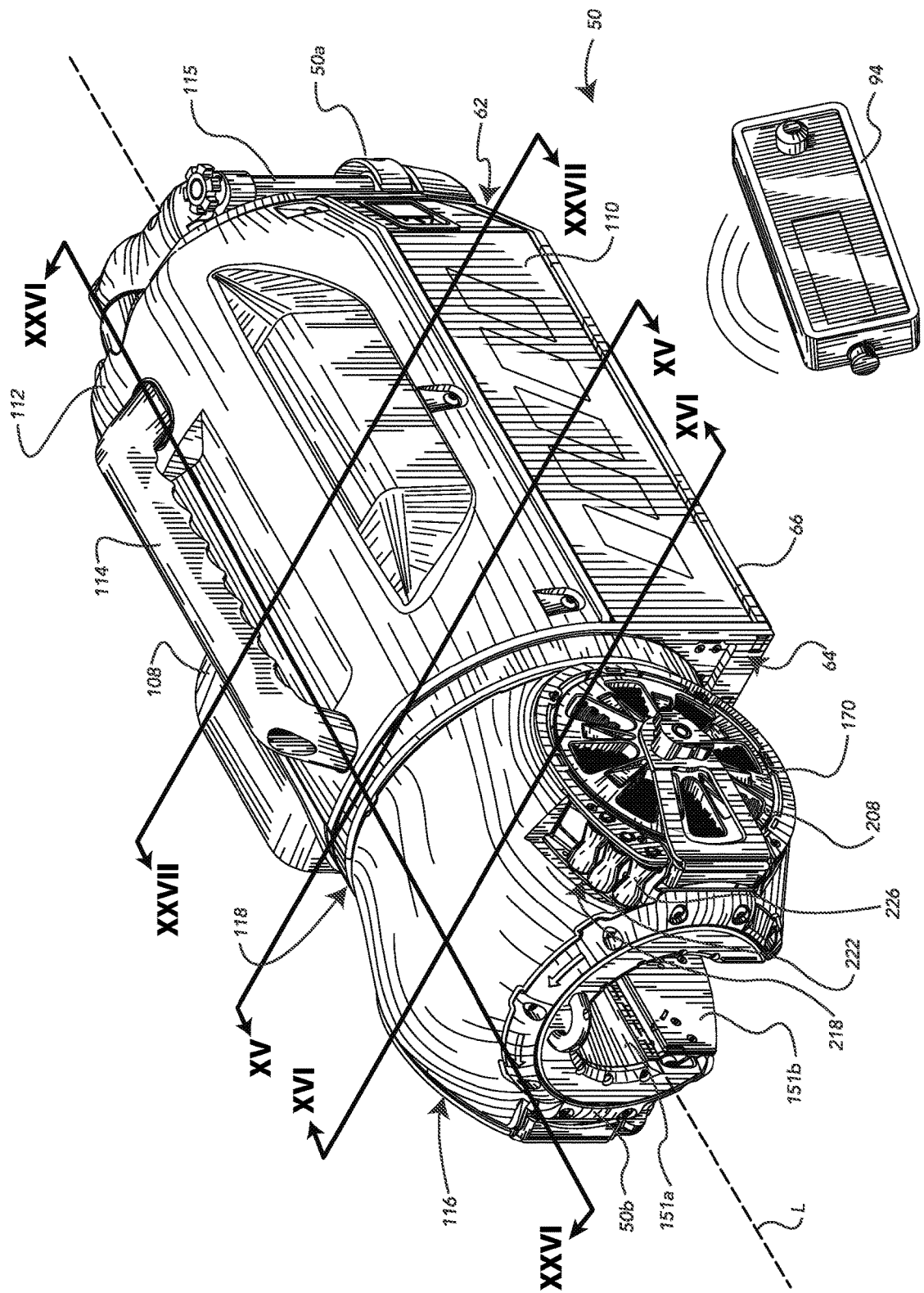
FIG. 1 is a top perspective view of a cable lasher according to the present invention, together with a remote control for remotely controlling the cable lasher.
Figure 2:
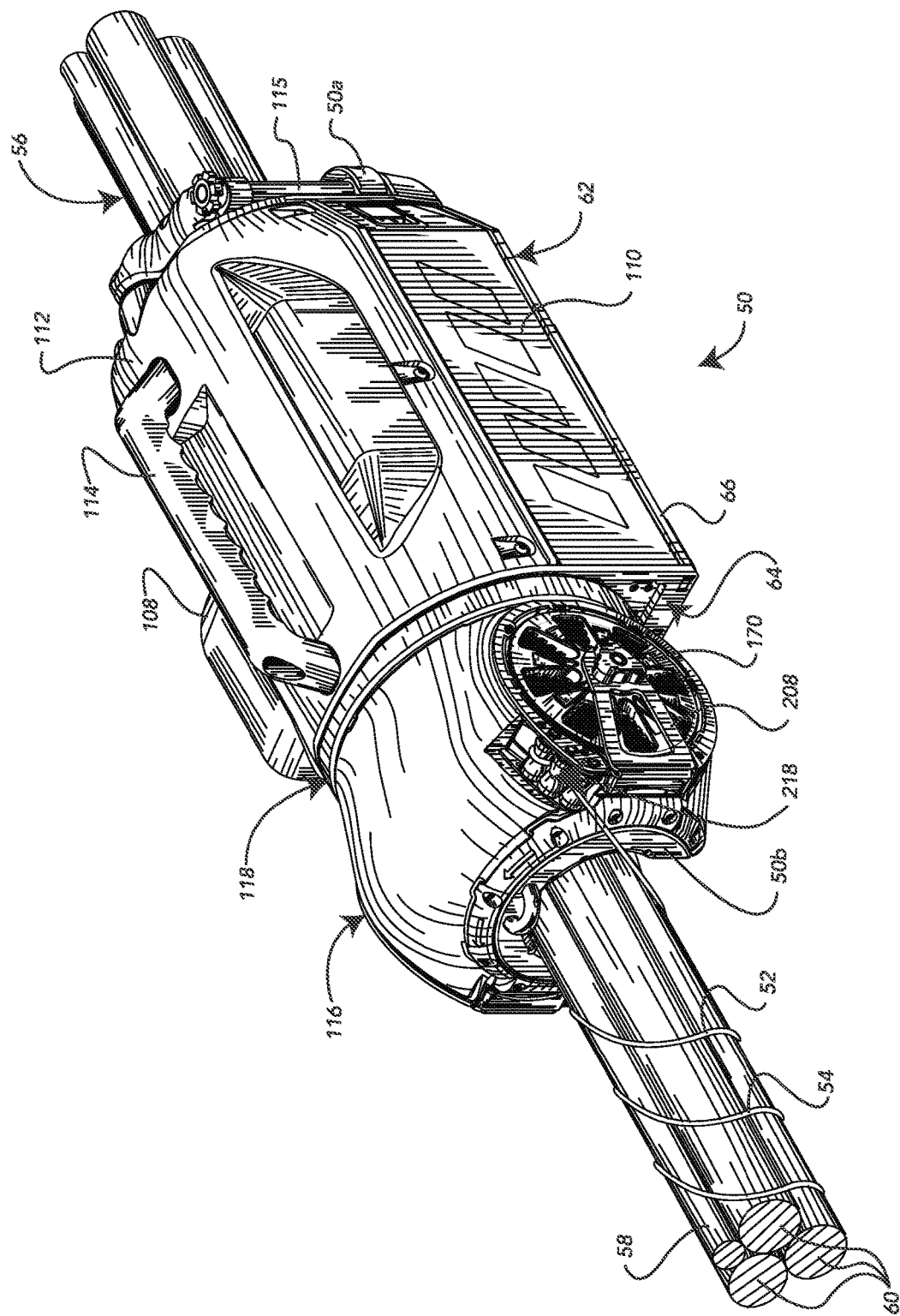
FIGS. 2 and 3 are top perspective views of the cable lasher of FIG. 1 operatively loaded with two lashing wire coils that dispense lashing wire, sequentially showing its advance on a group of cables being attached to each other.
Figure 3:
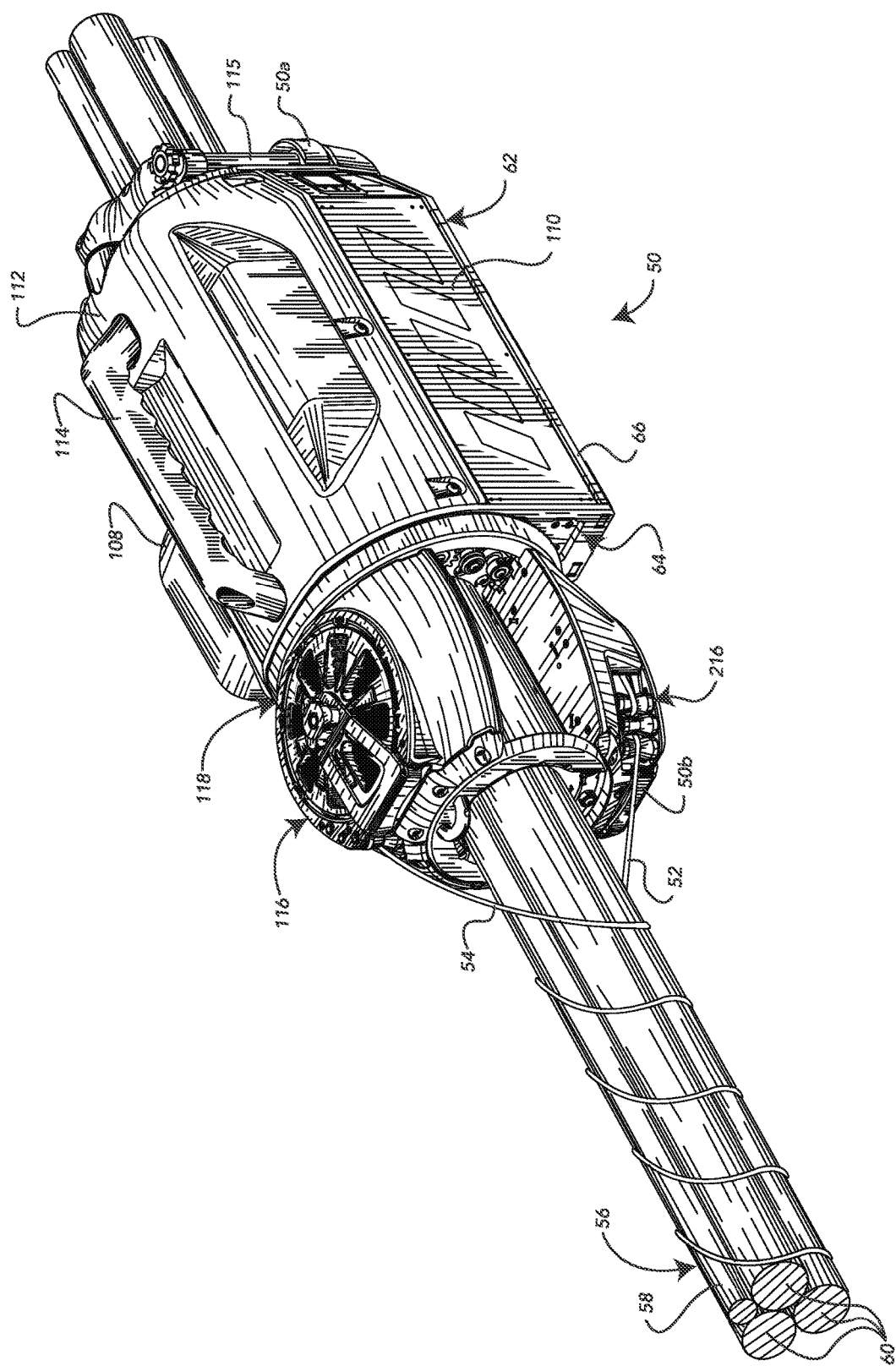

FIGS. 1-18 show an autonomous cable lasher 50 for winding a pair of lashing wires 52, 54 around a group of cables 56 that comprises one carrier cable 58 and three utility cables 60, to attach them to each other. While in the embodiment of FIGS. 1-18, the exemplary group of cables 56 specifically includes four cables 58, 60, it is understood that cable lasher 50 may attach a number of cables to each other, and this number of cables may include two or more cables forming the group of cables 56. Once attached, the group of cables 56 forms a cable bundle. Also, the cables 58, 60 can have varying diameters and arrangements, such that the group of cables 56 may have correspondingly varying cross-sectional shapes and sizes. Cable lasher 50 can accommodate groups of cables 56 of most usual sizes and configurations.

Cable lasher 50 defines a front, a.k.a. upstream, end 50a and a rear, a.k.a. downstream, end 50b, and is capable of displacement along the group of cables 56 by moving with its front end 50a at the fore and its rear end 50b at the aft.

Cable lasher 50 comprises a carriage 62 that is the part of cable lasher 50 that engages cables 58, 60 and allows it to move along cables 58, 60, as detailed hereinafter. More particularly, carriage 62 will ride at least one of the carrier or utility cables 58, 60 in a direction that is generally aligned with a longitudinal axis L that extends through cable lasher 50. Typically, carriage 62 will ride carrier cable 58, although it may ride another one of cables 58, 60, or more than one of cables 58, 60.

The actual position of longitudinal axis L is where the expected central line of a group of cables 56 of average size will be located; although it is understood that since the cables 58, 60 forming the group of cables 56 can vary in number and cross-sectional size from one group of cables to the next, and since carriage 62 will in fact swing during use (as detailed later), the position of longitudinal axis L can only be said to be "generally" aligned with that along which carriage 62 is expected to move as opposed to being precisely aligned with the direction in which carriage 62 moves.

Carriage 62 comprises a carriage frame 64 that includes a bottom wall 66, a number of intermediate walls 68, a front wall 69a and an end wall 69b that collectively form frame 64 and allow the different components, detailed hereinafter, to be carried by and fixed to carriage frame 64. Carriage frame also defines a cylindrical front channel wall 97 and a coextensive cylindrical rear channel wall 151a that together define a channel 96 extending through cable lasher 50 about longitudinal axis L. Front straight walls 98 depend from front cylindrical wall 97, and rear straight walls 151b depend from rear cylindrical wall 151a, to form aligned openings allowing access to 96. Rear carriage walls 151a, 151b are detachable from the rest of carriage frame 64, together with the lashing apparatus 116 (see below), to facilitate maintenance and repair.

Carriage 62 also comprises a drive mechanism 70 carried by carriage frame 64, for autonomously driving carriage 62 along cables 58, 60. More particularly, drive mechanism 70 comprises a pair of front and rear drive wheels 72, 74 that have an hourglass shape and a high-friction outer surface for a stable propulsion engagement on one or more of the cables 58, 60. It is through drive wheels 72, 74 that carriage 62, and the entire cable lasher, is supported on cables 58, 60 and driven to move on cables 58, 60.

Drive mechanism 70 further comprises a motor 76 carried by frame 64, and coupled to the rear drive wheel 74 by means of a gear box 78 that has suitable reduction and/or gear transmissions, as known in the art. A transmission belt 80 tensioned between front and rear transmission wheels 82, 84 forces the front drive wheel 72 to rotate together with rear drive wheel 74 when the latter is rotated by motor 76, due to transmission wheels 82, 84 being respectively axially coextensively attached to drive wheels 72, 74.

Figure 6:
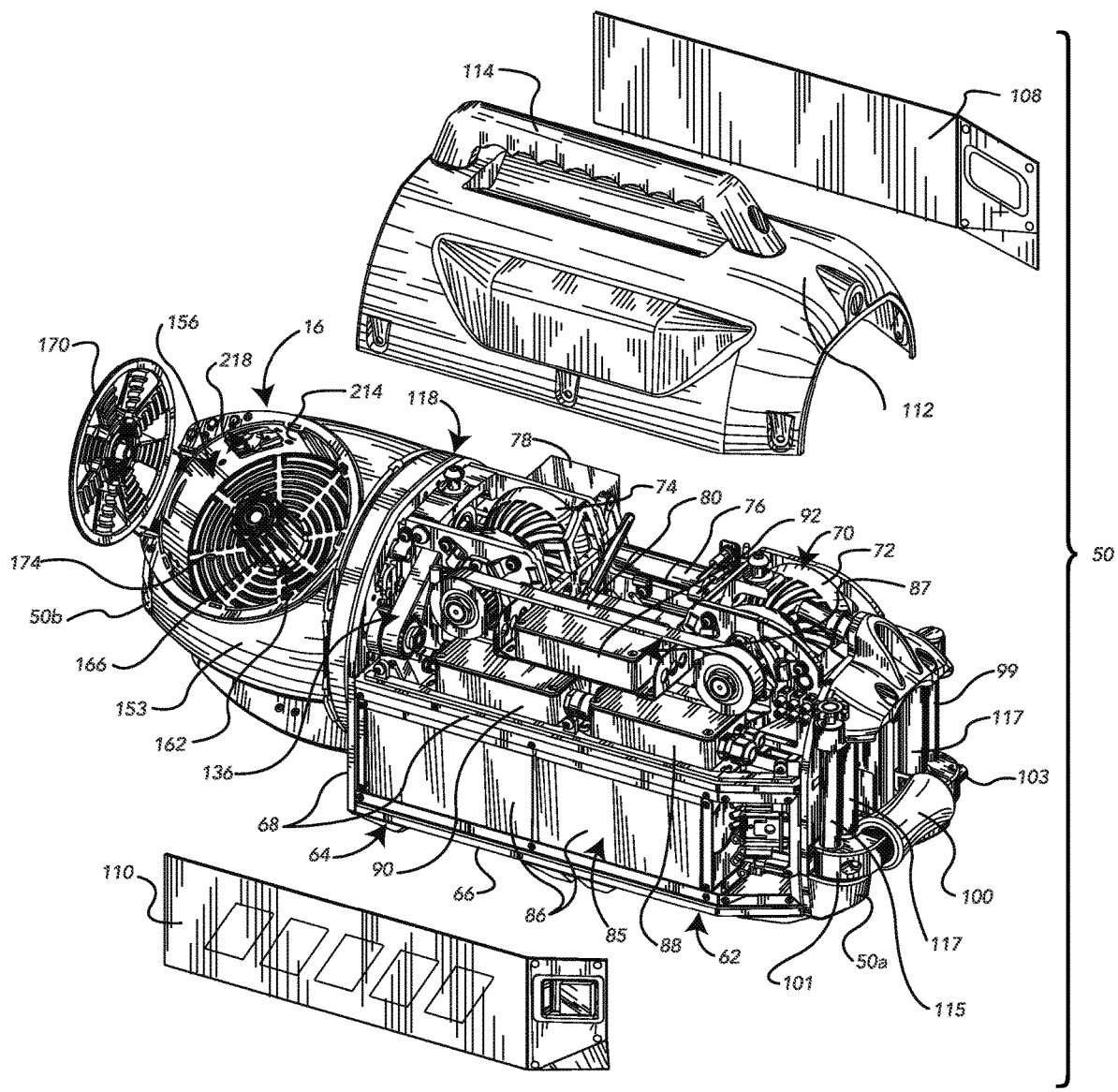
FIG. 6 is an exploded top perspective view of the cable lasher of FIG. 1, with the frame and battery cover panels being exploded away from the frame to show the inner components of the cable lasher, and with the door of one lashing wire magazine being opened to show the hollow magazine destined to receive lashing wire therein.
Figure 7:
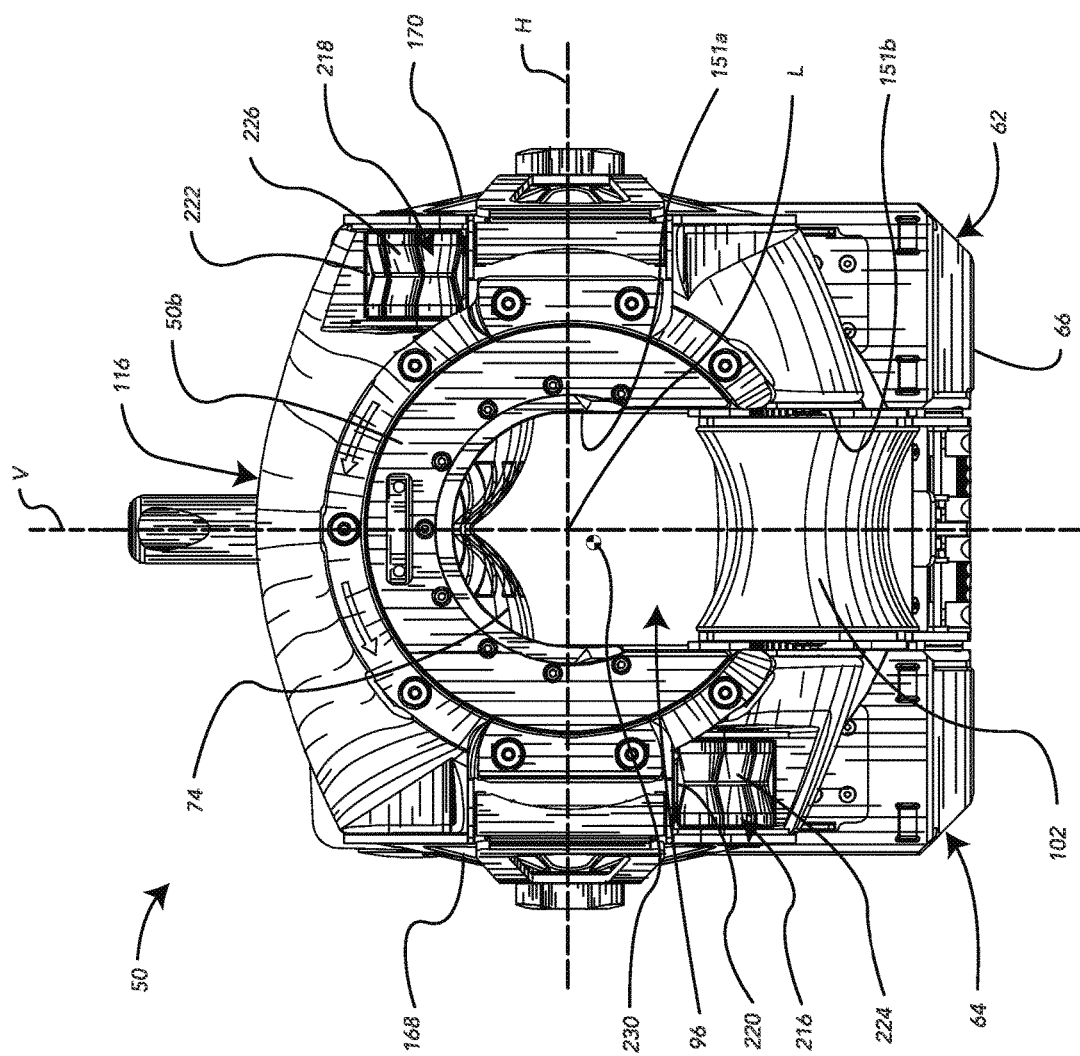
FIG. 7 is a rear elevation of the cable lasher of FIG. 1, showing the position of its center of mass relative to its horizontal and vertical axes.
Figure 8:
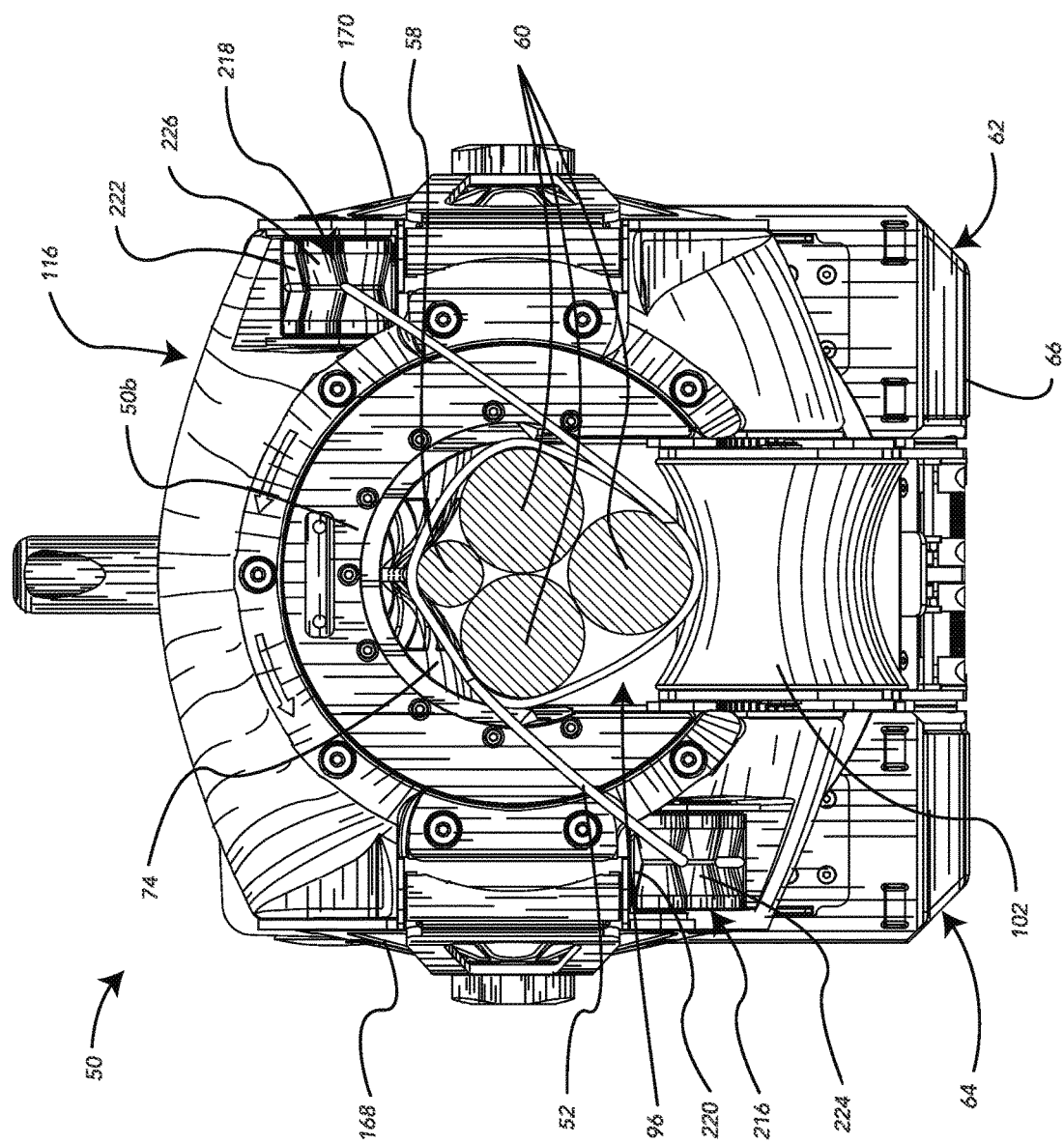
FIG. 8 is similar to FIG. 7, but without the representation of the center of mass, and instead showing a group of cables in cross-section being attached by lashing wire.
Figure 9:
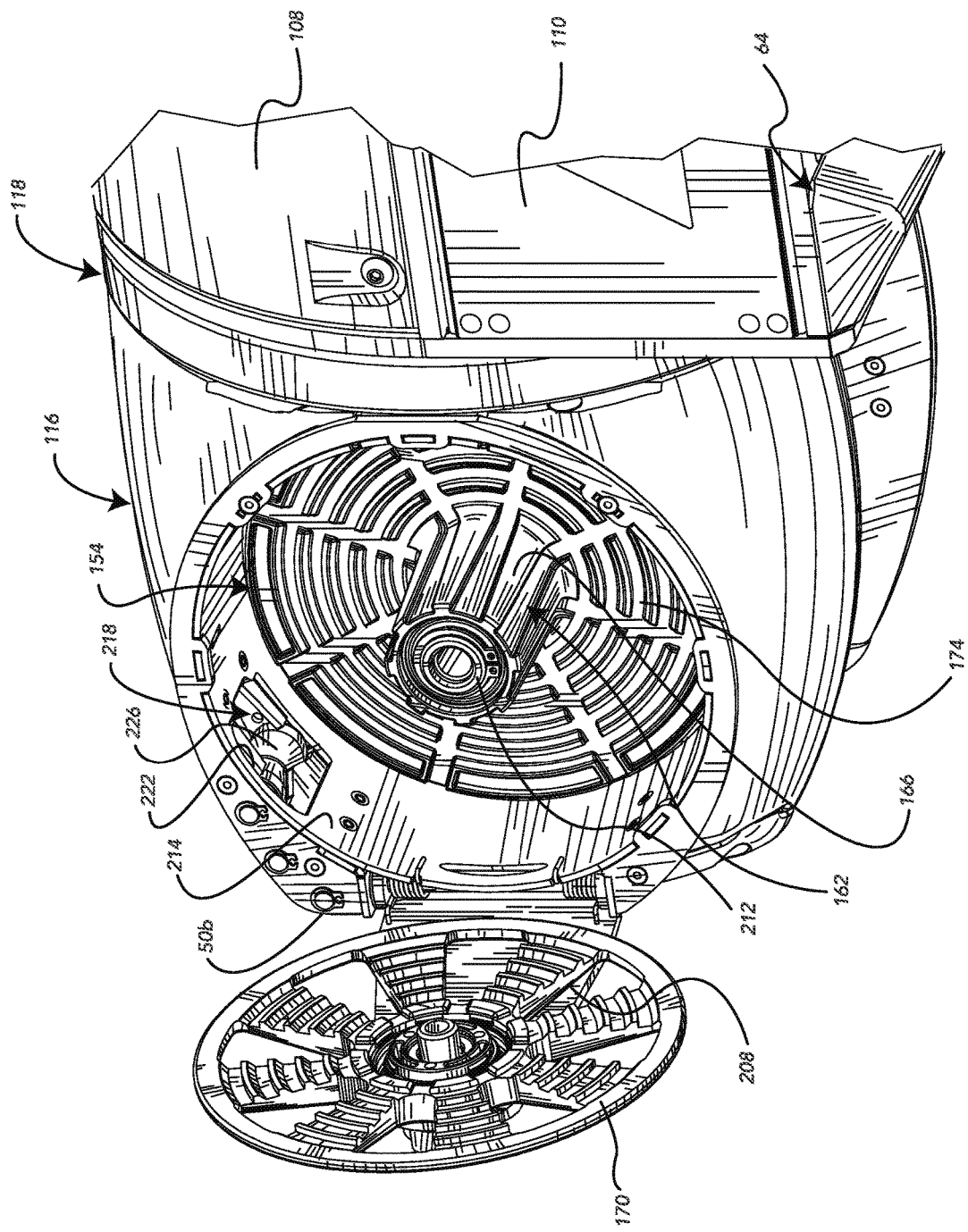
FIG. 9 is an enlarged perspective view of the rear portion of the cable lasher, specifically showing the lashing apparatus having one of its magazine doors being opened and the empty magazine within.
Figure 10:
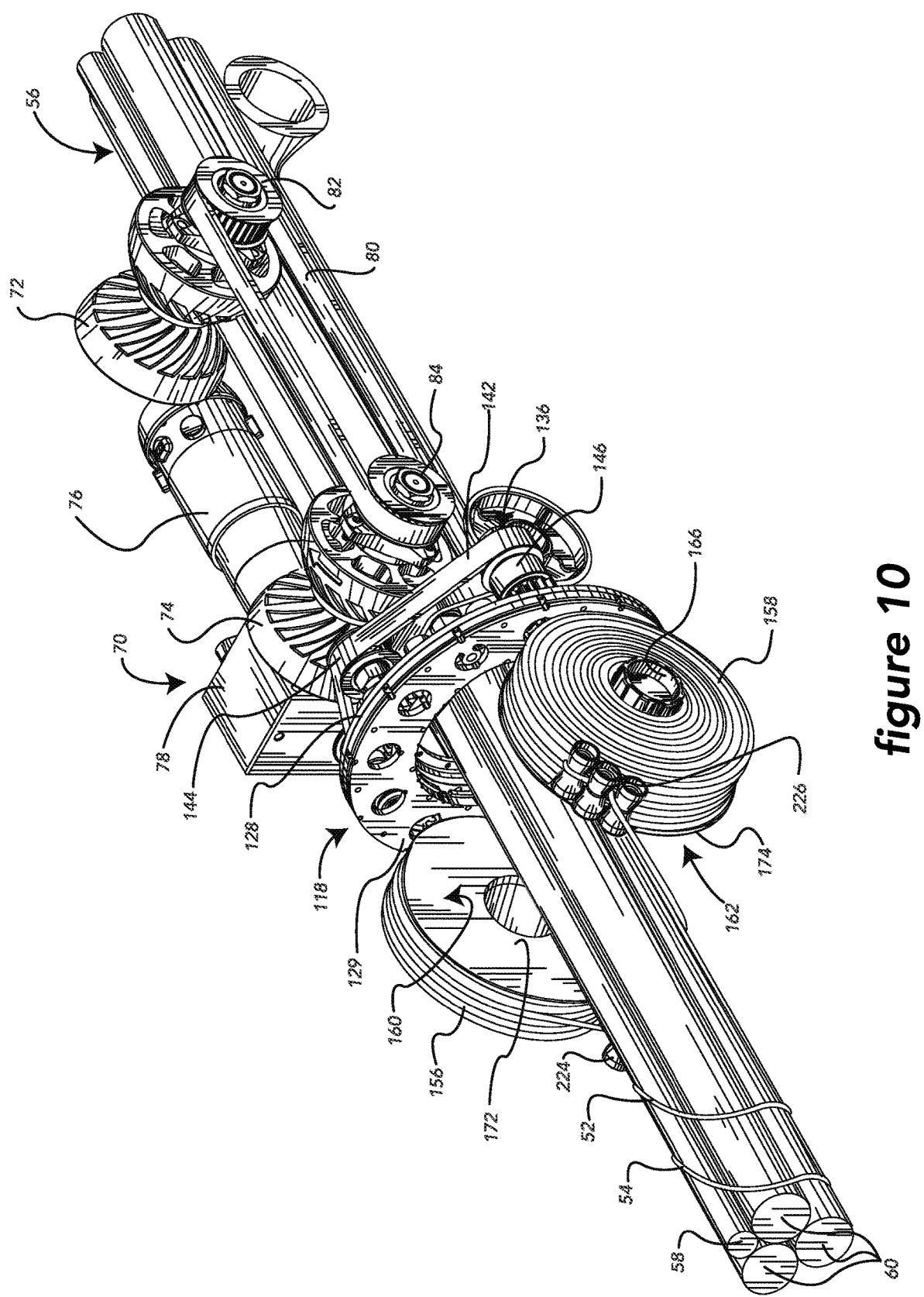
FIGS. 10 and 11 are respectively similar to FIGS. 2 and 3, but with several component of the cable lasher being removed, notably the carriage and lashing apparatus frames, cover panels and the batteries, to show particularly the drive mechanism and the bottom rollers of the carriage, the lashing apparatus actuator, and the lashing wire spools that each carry a coil of lashing wire.
Figure 11:
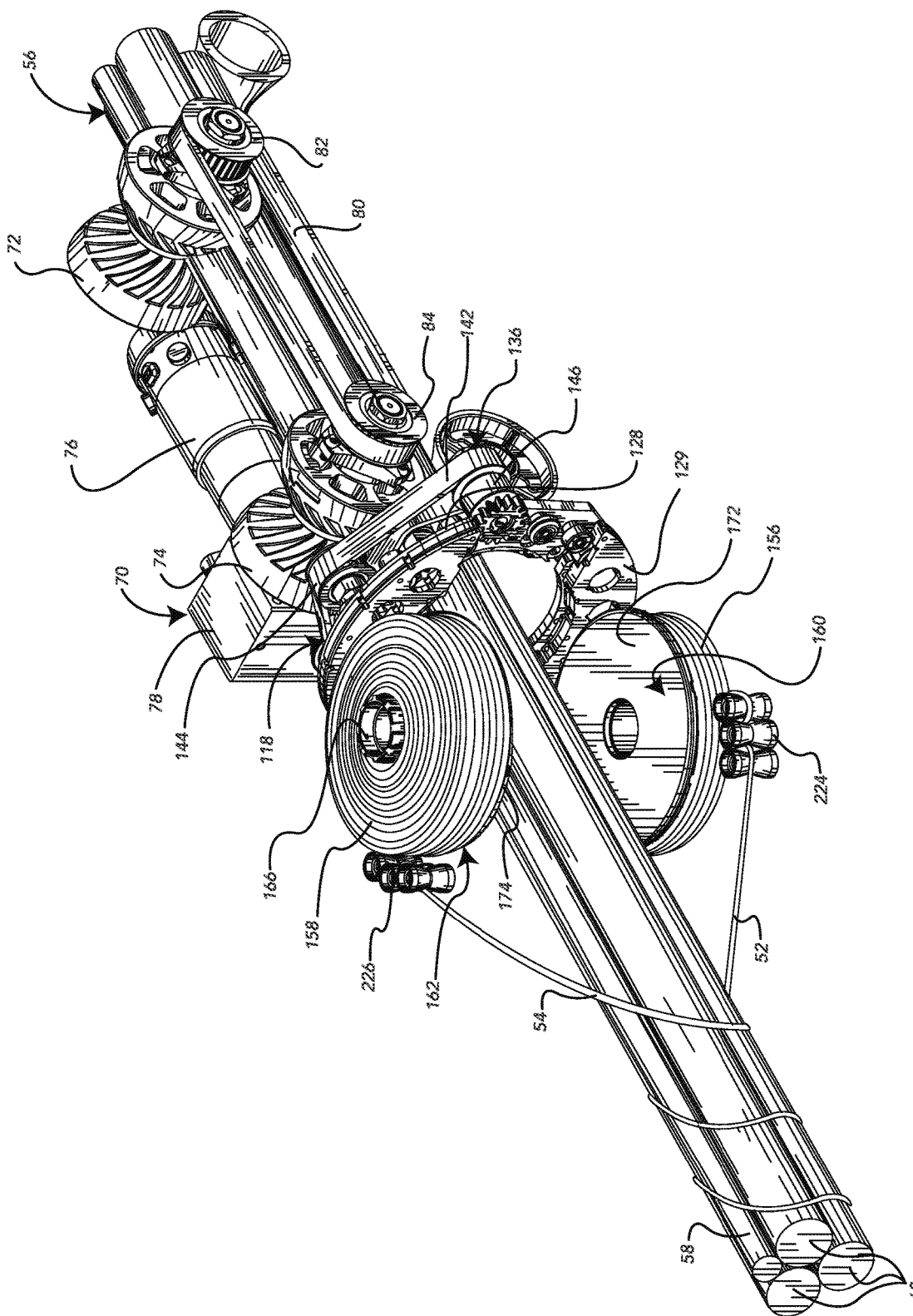
Figure 12:
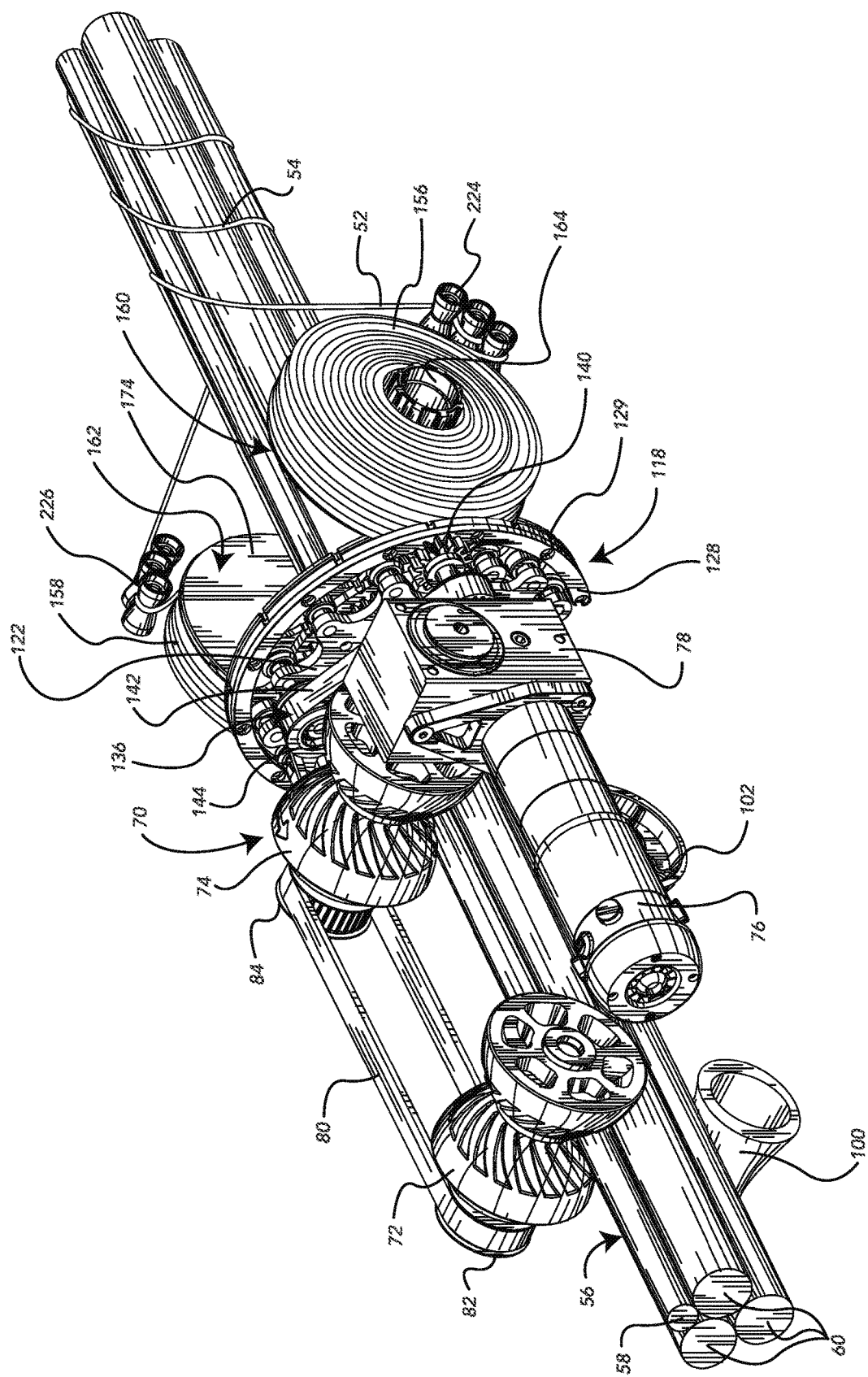
FIG. 12 is similar to FIG. 10, but the perspective is taken from the front, left side instead of the rear, right side.
Figure 13:
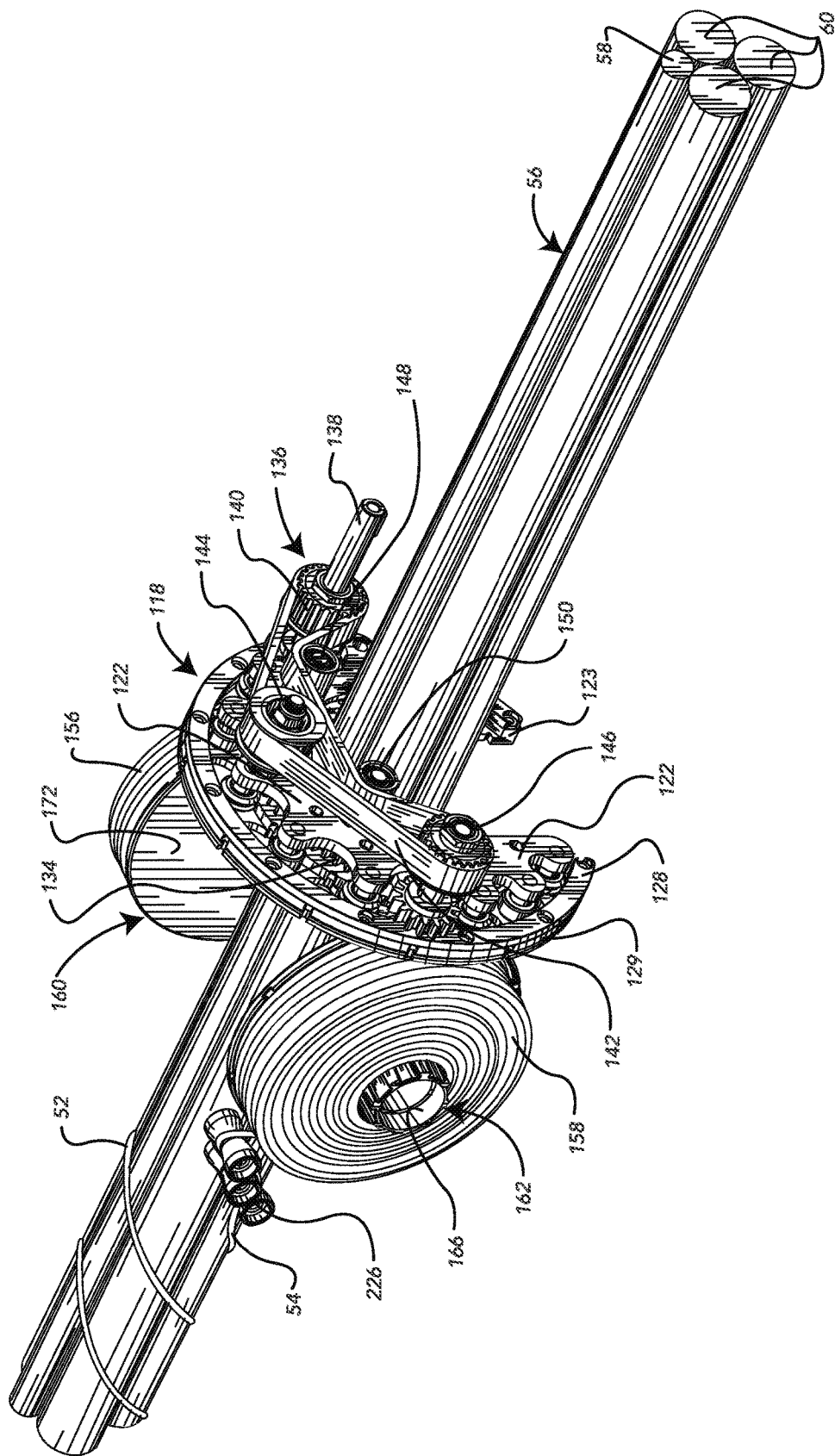
FIG. 13 is a perspective view similar to FIG. 10, but the perspective is taken from the front, right side instead of the rear, right side; and the carriage drive mechanism is removed to more specifically show the lashing apparatus actuator.
Figure 14:
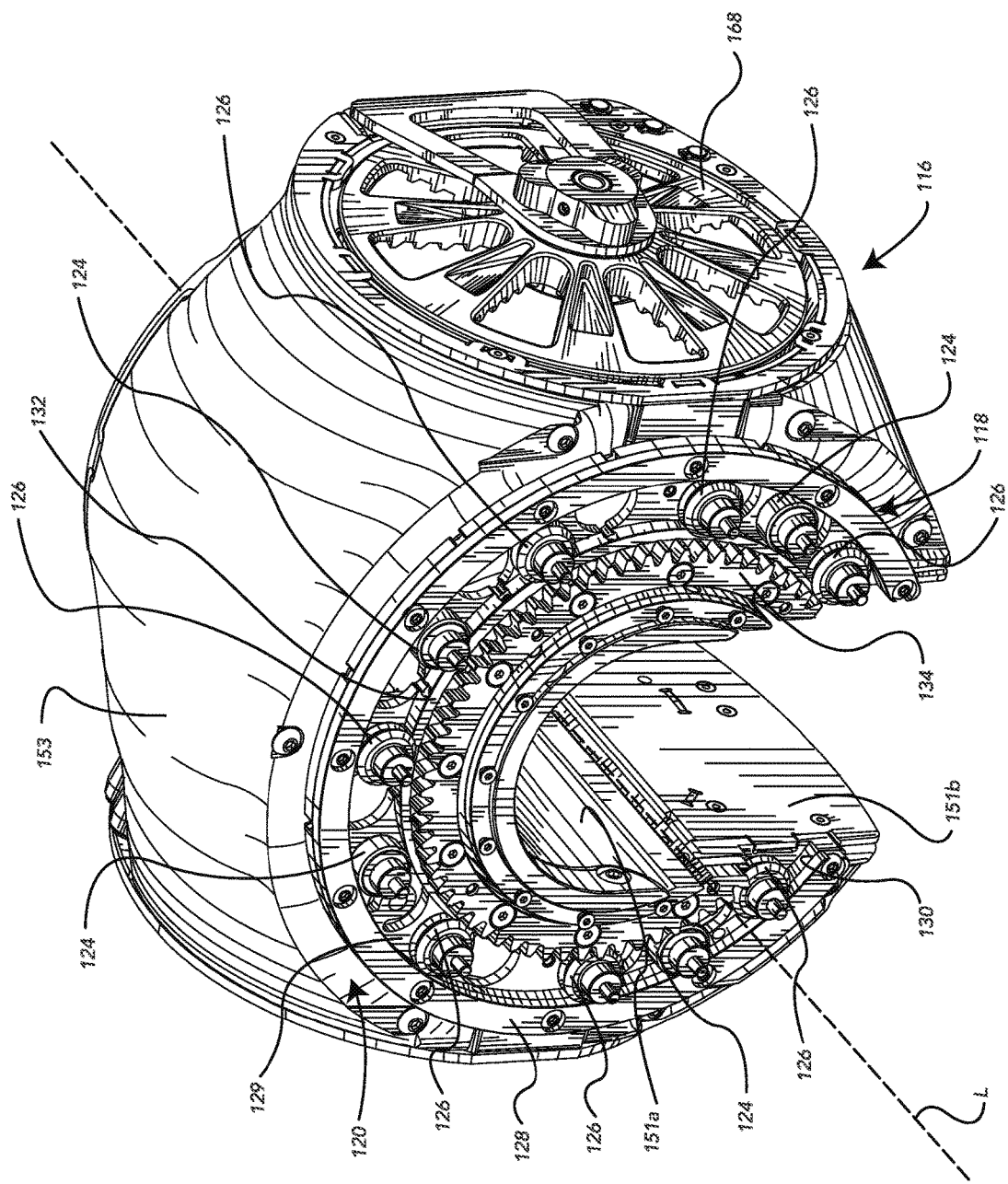
FIG. 14 is a perspective view of the lashing apparatus of the cable lasher of FIG. 1, albeit from the left and the front instead of from the rear and the right.
Figure 15:
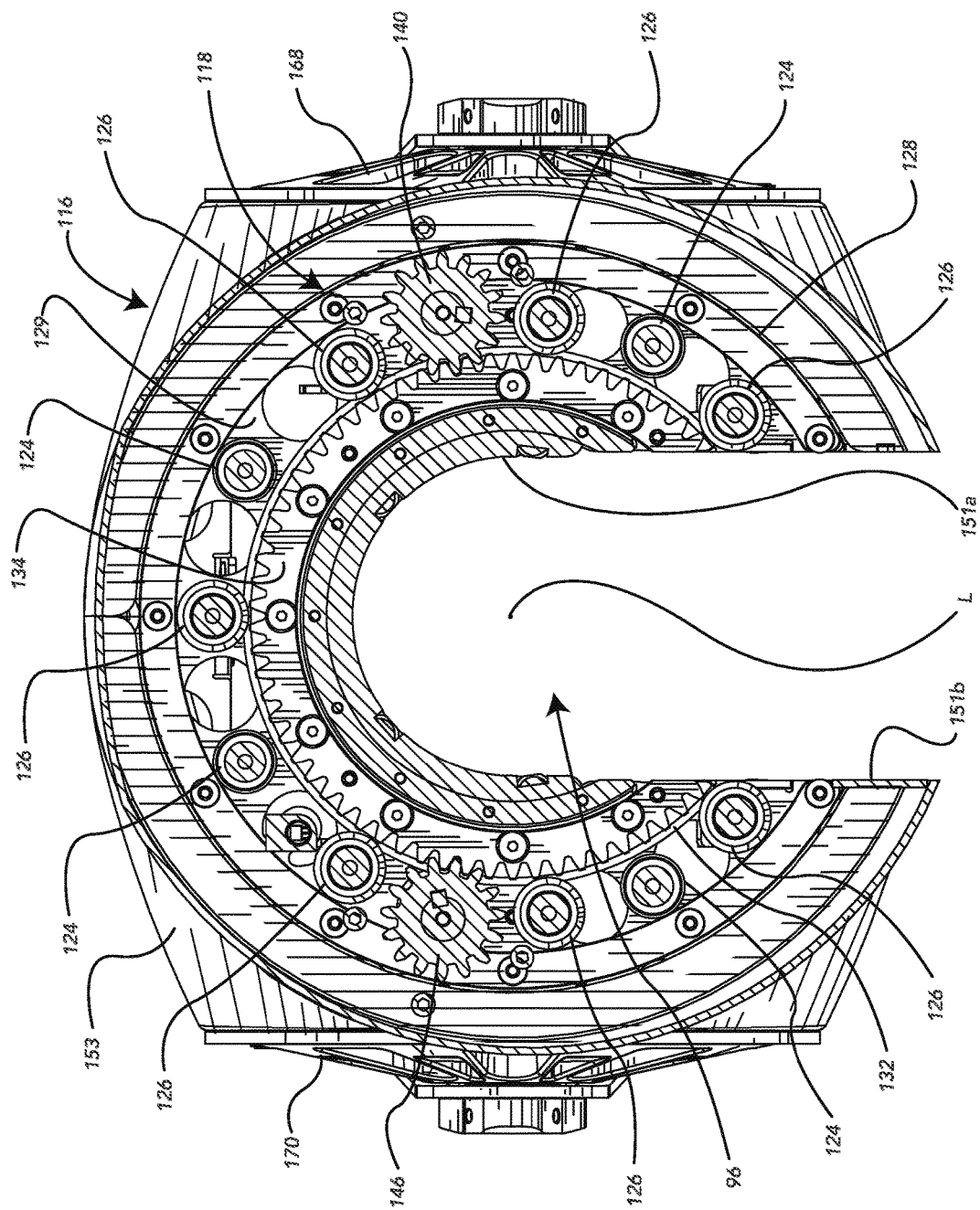
FIG. 15 is a cross-sectional view, at an enlarged scale, taken along line XV-XV of FIG. 1.
Figure 16:
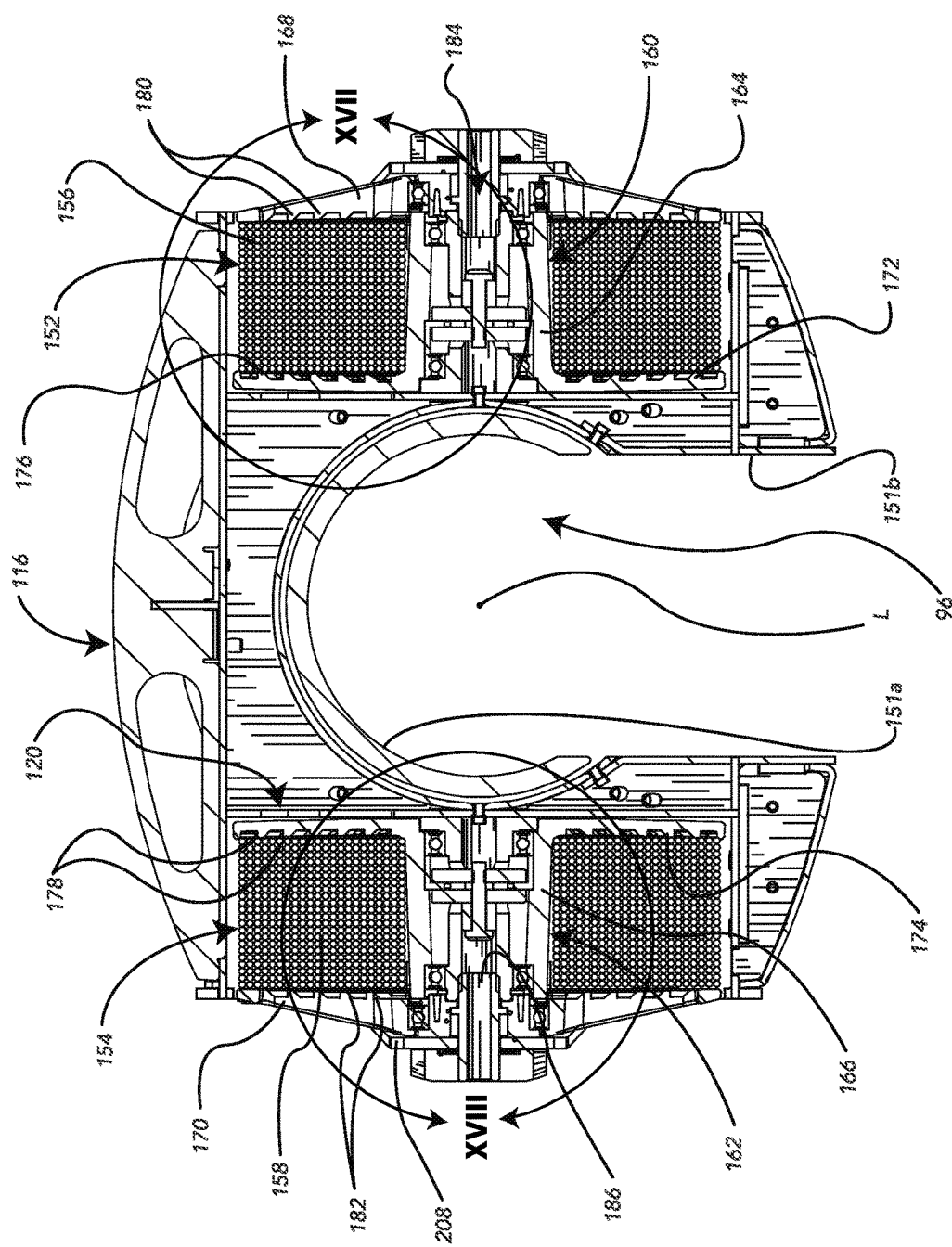
FIG. 16 is a cross-section view taken along line XVI-XVI of FIG. 1.
Figure 17:
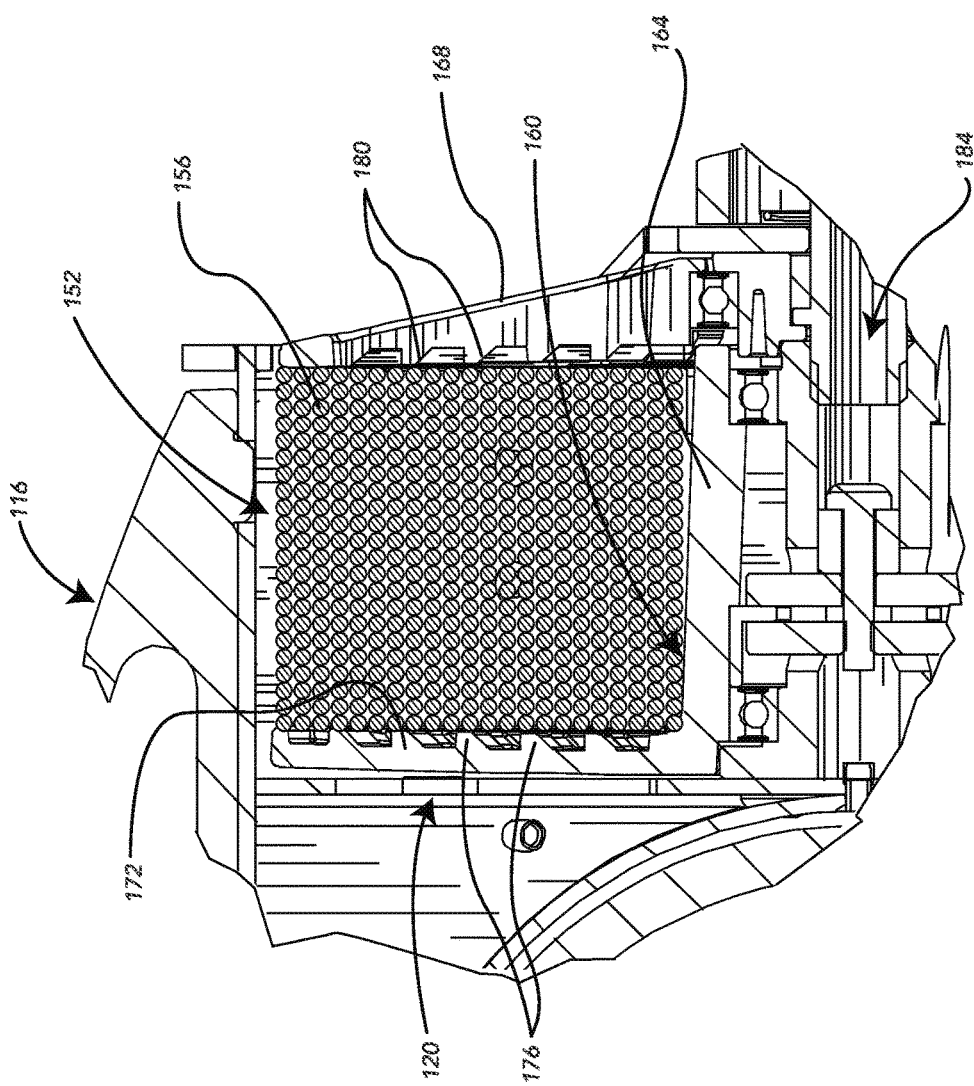
FIG. 17 is an enlarged view of the area circumscribed by circle XVII of FIG. 16.
Figure 18:
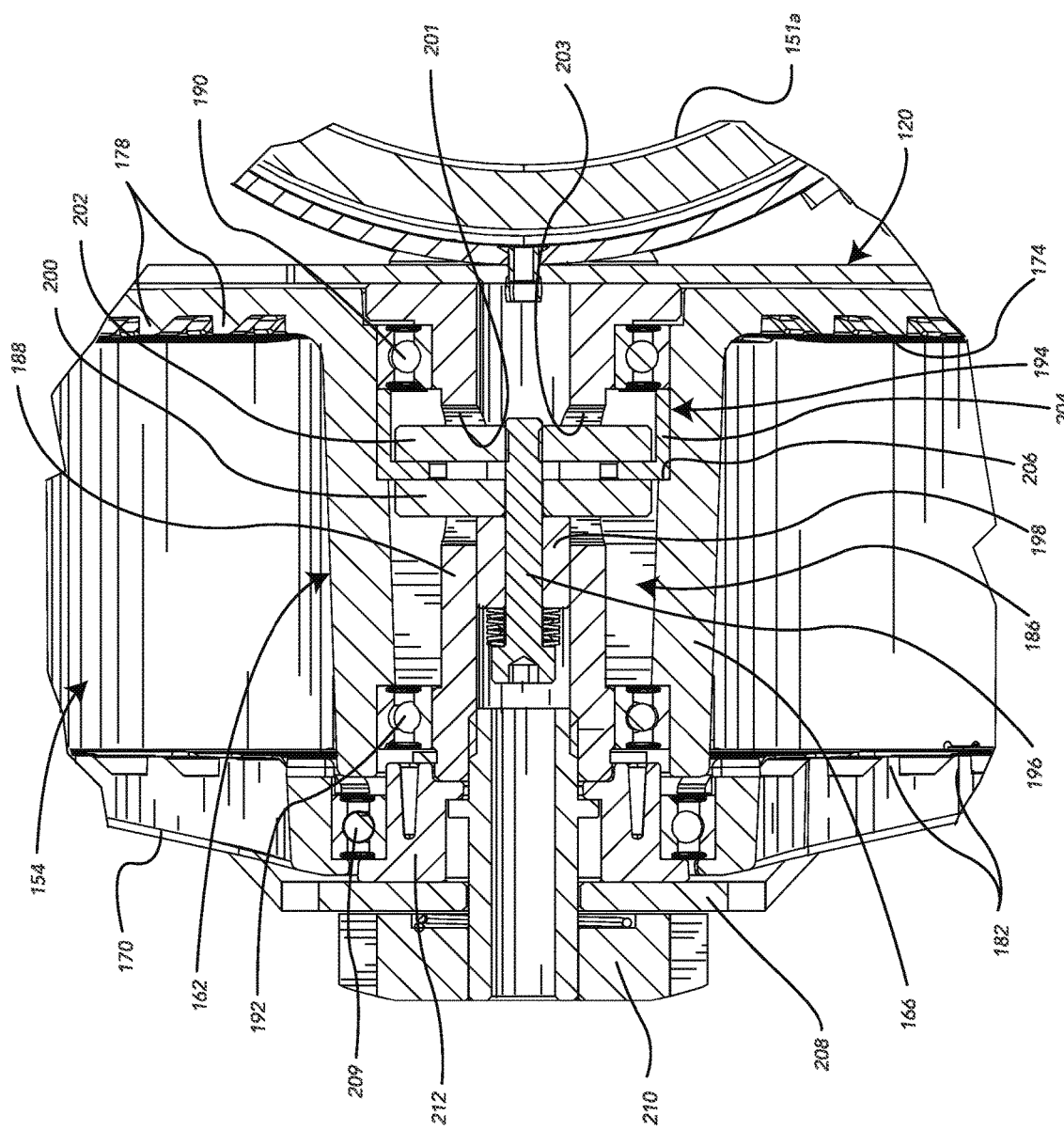
FIG. 18 is an enlarged view of the area circumscribed by circle XVIII of FIG. 16.
Figure 23:
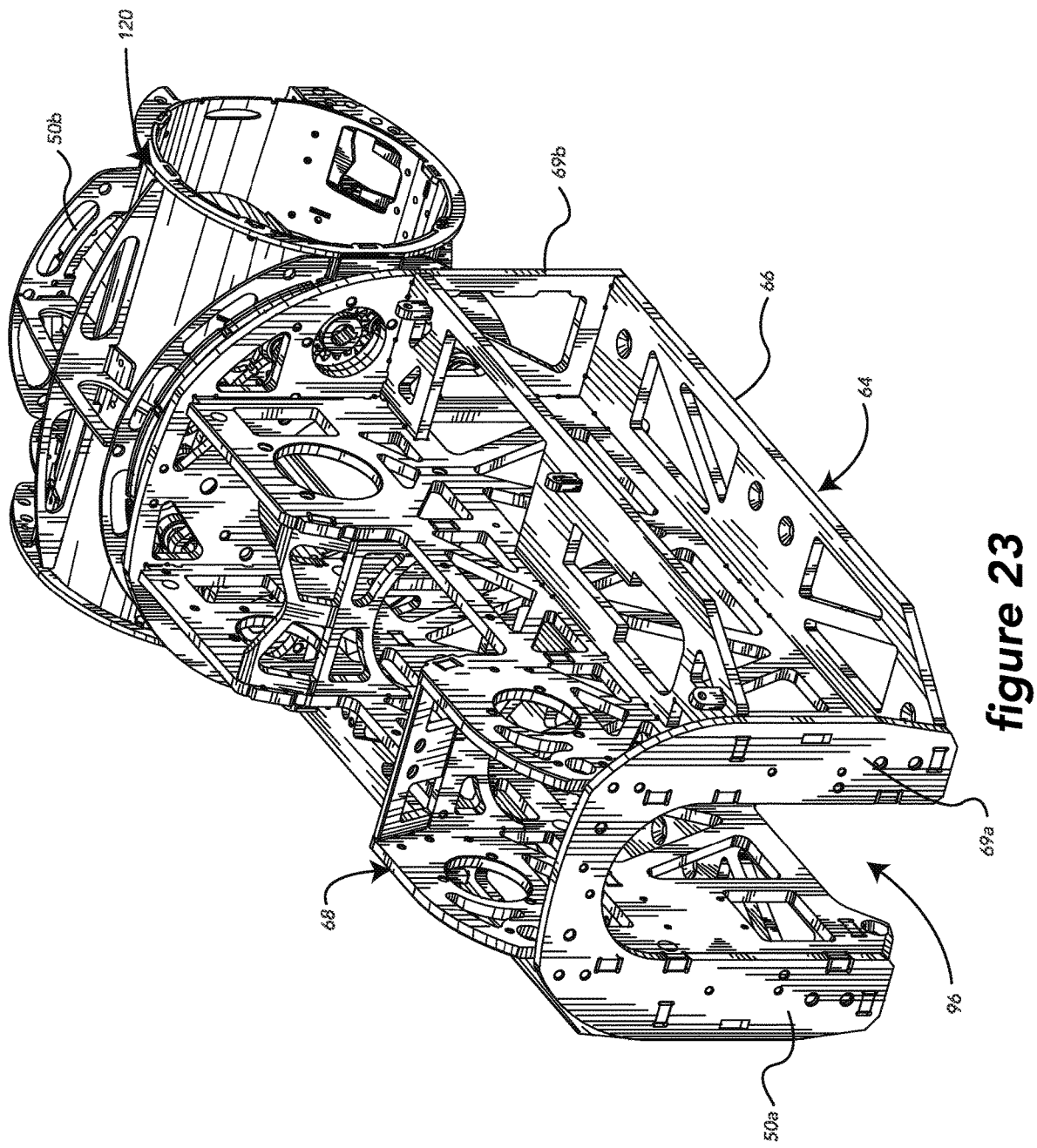
FIG. 23 is a perspective view from the top, front and left sides, showing only the frames of the carriage and of the lashing apparatus.

Carriage 62 also comprises a power source 85 for powering drive mechanism 70, and namely for powering motor 76. The power source more specifically comprises a number of batteries 86 carried by carriage frame 64. In FIG. 6 two batteries 86 are shown, but two additional batteries are also provided on the opposite side of carriage 62 but are concealed in the figures.

Carriage 62 further comprises a drive controller 87 that controls the drive mechanism 70. Drive controller 87 can include any component as will be obvious to a person skilled in the art for allowing a user to control the advance of carriage 62 by means of drive wheels 72, 74 being selectively rotated by motor 76 which is, in turn, powered by batteries 86 (which can come as battery assemblies). In the embodiment shown in the drawings, drive controller 87 comprises a power management module 88 that manages battery 86 electric current, a motor drive and relay module 90 that controls electric current feed to motor 76, and a system computer and transceiver 92 that can send information to and receive information from a remote control 94 (FIG. 1) and apply instructions for controlling motor 76. The components of drive controller 87 are carried by carriage frame 64.

System computer and transceiver 92 is suitably equipped to upload, download, store and process operation data relative to the functioning of cable lasher 50, as will be obvious to a person skilled in the art. The signal between remote control 94 and transceiver 92 may be through any known wireless connection, including radio frequency transmission, Wi-Fi, satellite or any other appropriate wireless communication method. Remote control 94 may be controlled by a user to remotely control the advance of cable lasher 50 on cables 58, 60, for example a user standing on the ground a distance away and below the cable lasher 50 may control cable lasher 50 by using remote control 94. Remote control 94 can be a dedicated device, or can be a smartphone or other existing computerized device with an onboard transceiver, on which appropriate software can be installed and data, processed.

As noted above, cable lasher 50 defines a channel 96 that extends along and about longitudinal axis L for receiving the cables 58, 60 therein. Channel 96 is formed by the generally cylindrical front channel wall 97 and by the coextensive generally cylindrical rear wall 151a, at the center of which the cables 58, 60 extend. Drive wheels 72, 74 extend through front channel wall 97 within channel 96 to rest on cables 58, 60.

Drive mechanism 70 includes a front guiding roller 100 pivotally mounted to frame 64 by means of a front roller mount 101 that pivots about a front roller pivot bar 115 at the cable lasher front end 50a. More particularly, front guiding roller 100 is pivotable between an opened position shown in FIG. 4 in which it is pivoted away from opening 98 and a closed position shown in FIG. 5 in which it is pivoted into opening 98 to bridge opening 98, so as to form a front bottom barrier to channel 96 to prevent egress of cables 58, 60 from channel 96 during use. Front roller 100 has a latch 103 that releasably engages a latching bar 99 carried by frame opposite pivot bar 115 relative to opening 96. Front roller 100 is further movable up and down along pivot bar 115 and latching bar 99, and its position therealong may be fixed, to allow the user to pusher front roller 100 against the underside of the group of cables 56 when cable lasher 50 is installed.

Figure 4:
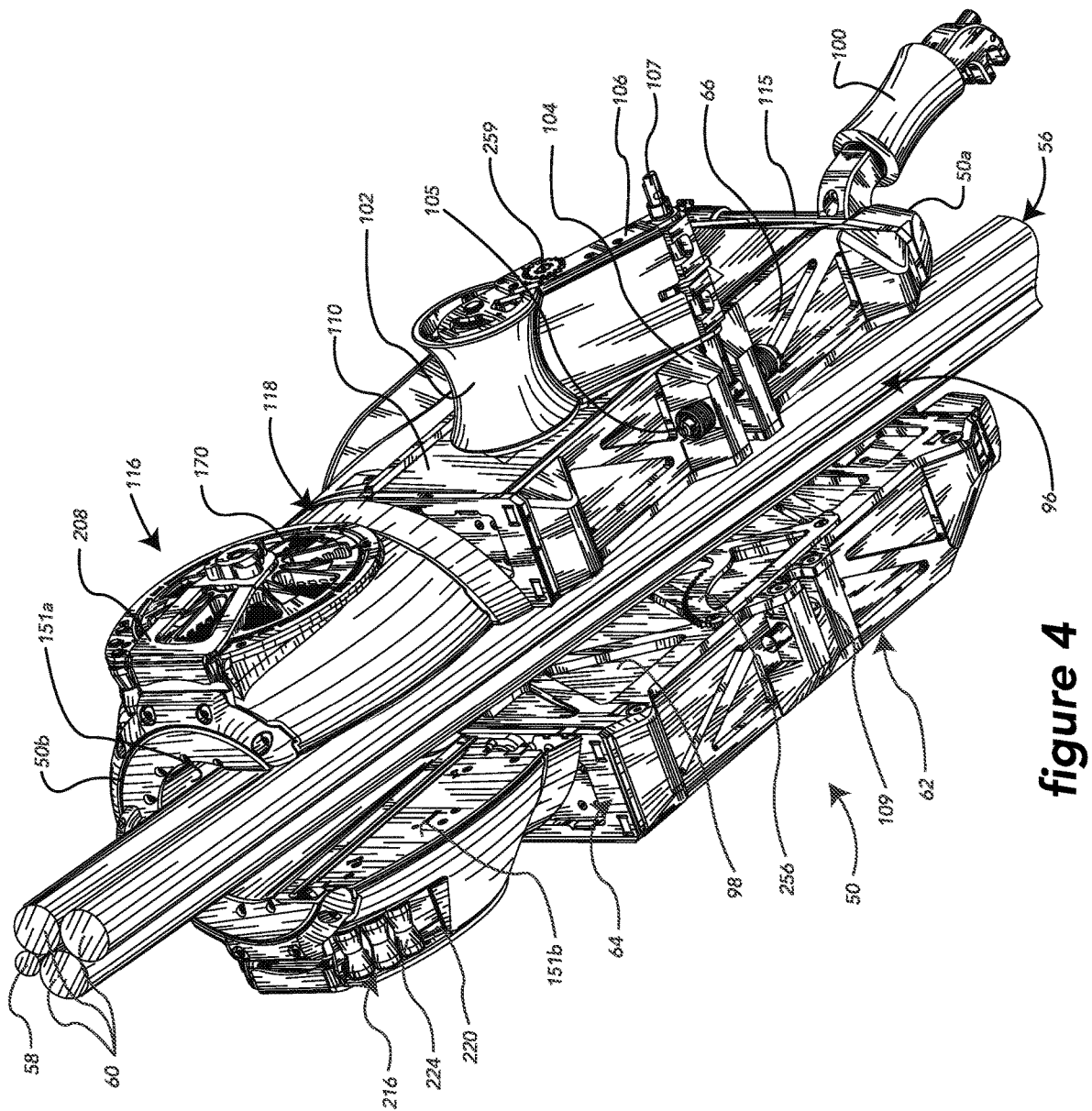
FIGS. 4 and 5 are bottom perspective views of the cable lasher of FIG. 1, respectively showing the bottom rollers in their opened and closed positions.
Figure 4A:
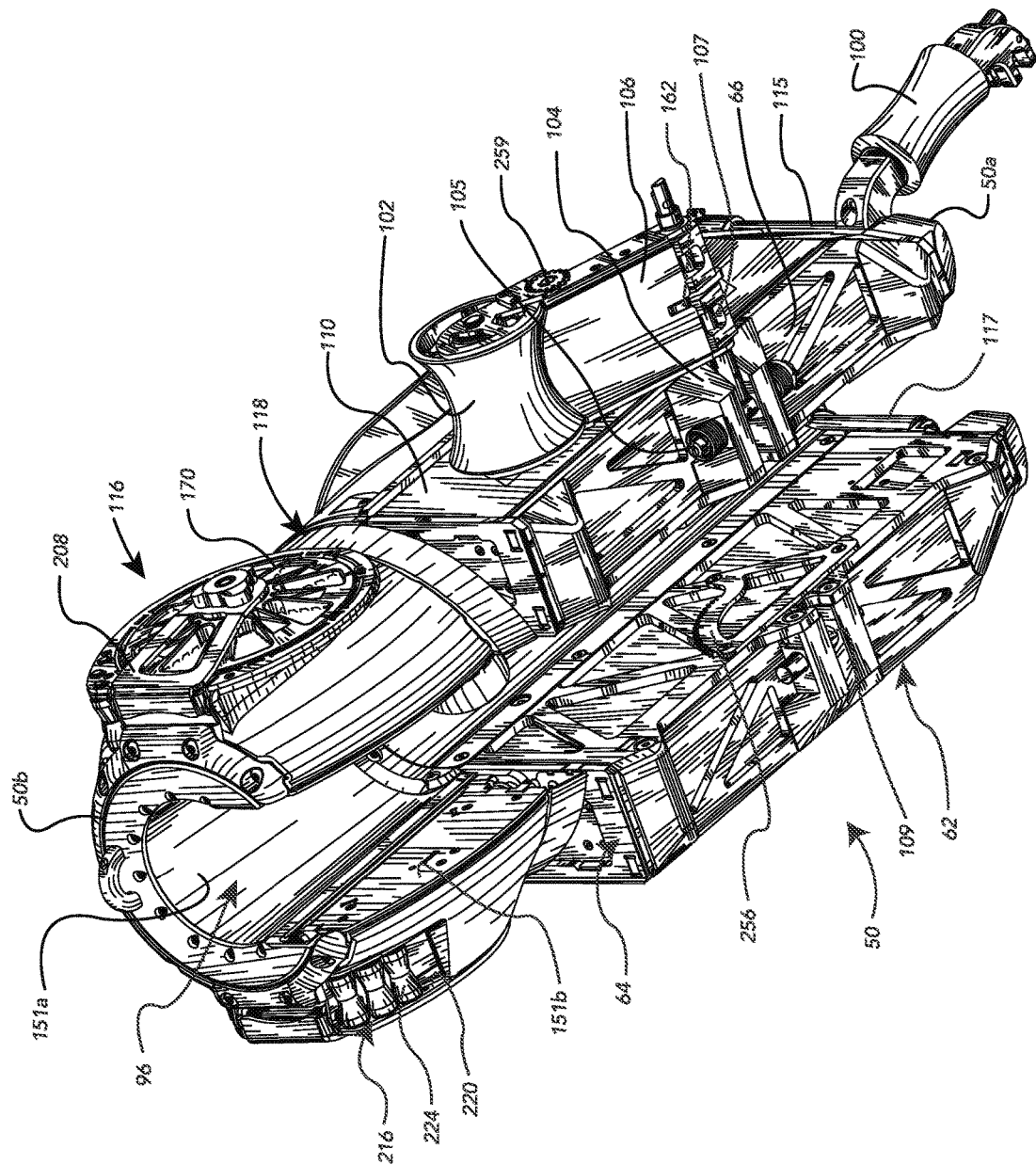
FIG. 4a is similar to FIG. 4, but with the cables being removed.
Figure 5:
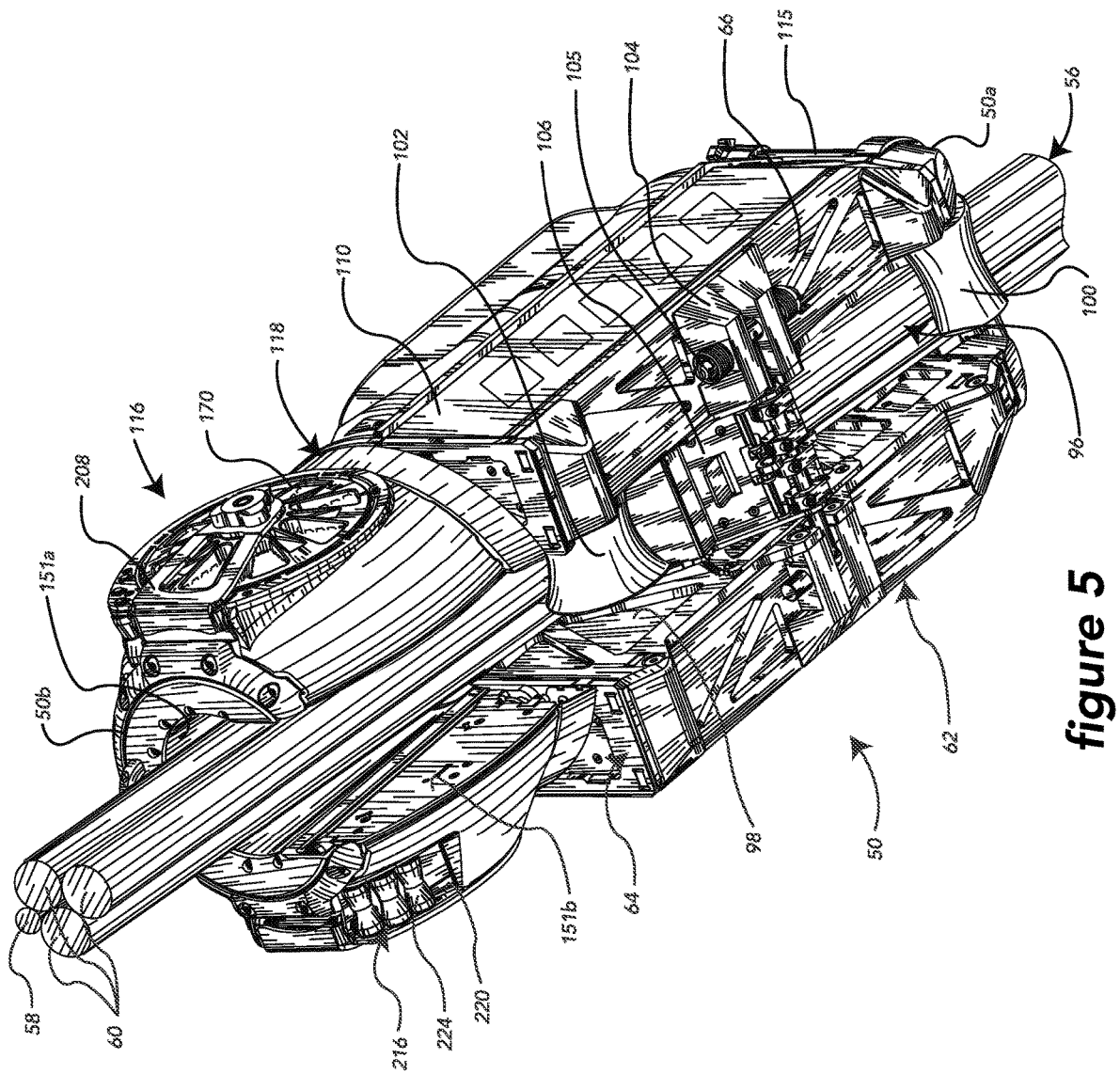
Figure 27:
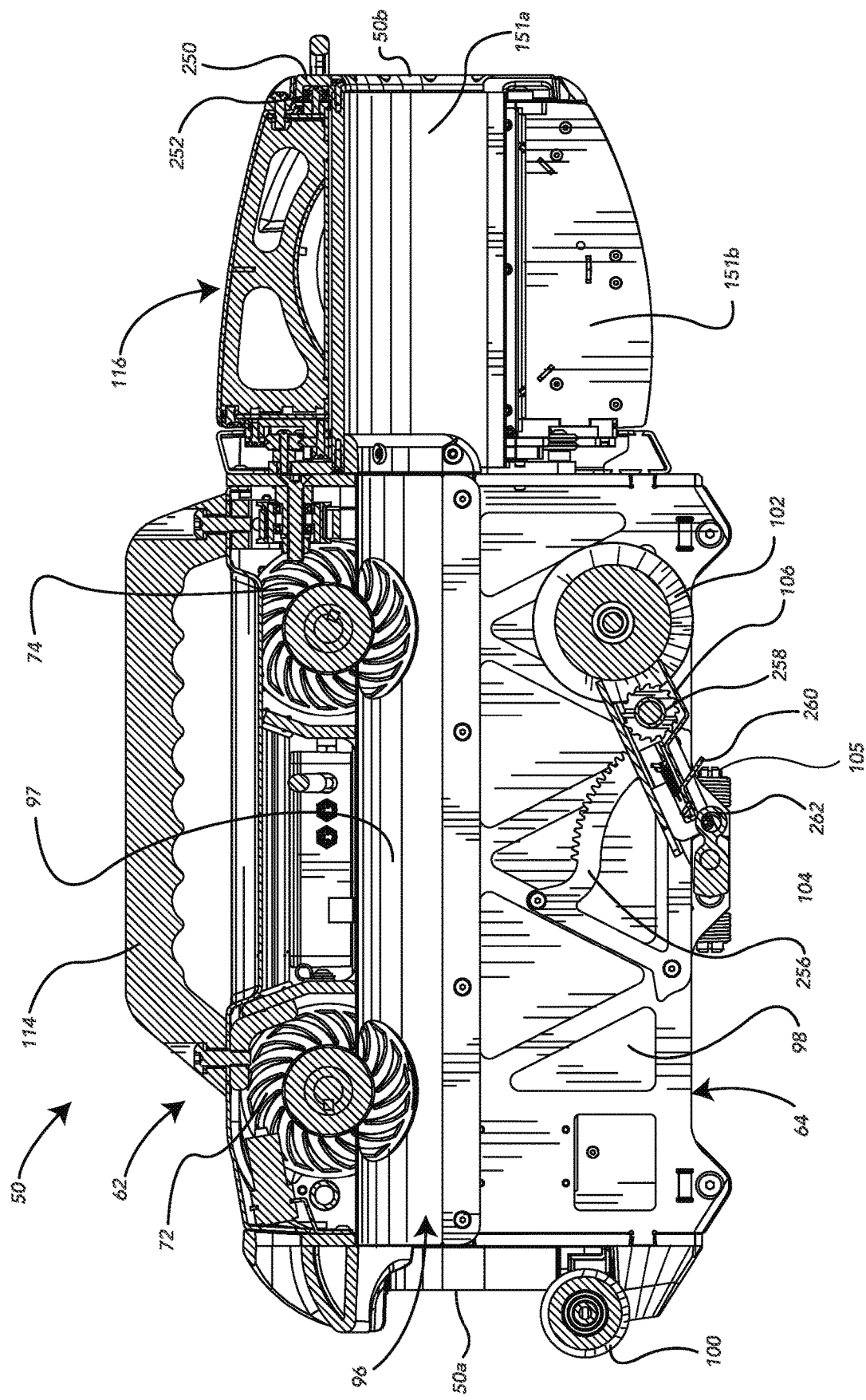

Drive mechanism 70 further includes a pressure roller 102 pivotally mounted to the bottom wall 66 of frame 64. Pressure roller 102 is carried by a pressure roller arm 106 that is pivotably mounted by means of a pressure roller mount 104 that carries a pivot shaft 105 to carriage frame 64 near opening 98 albeit rearwardly of front guiding roller 100. More particularly, pressure roller 102 is pivotable about pivot shaft 105 between an opened position shown in FIG. 4 in which it is pivoted away from opening 98 and a closed position shown in FIG. 5 in which it is pivoted both into opening 98 to bridge opening 98 so as to form a second barrier to channel 96 to prevent egress of cables 58, 60 from channel 96 during use. First pivot shaft 105 is spring-loaded to force arm 106 towards its opened position but may be manually forced against this spring bias into its closed position. Pivot arm 106 includes a latching arm 107, fixed to first pivot shaft 105, that latches into a releasable latch 109 when arm 106 reaches its closed position, to maintain arm 106 in its closed position. Arm 106 is further pivotable about latching arm 107, such that in its closed position it may pivot towards and away from cables 58, 60. As shown in FIGS. 4, 4a and 27, the pivotal movement of arm 106 and, hence, of pressure roller 102, is guided by means of gear wheels 259 that are rotatably mounted on both sides of arm 106 that engage arcuate rails 256 fixed to the inner front walls 98 of carriage frame 64. The engagement of gear wheels 259 on rails 256 allow the torque on the entire assembly of arm 106, latching arm 107, pivot shaft 105 and pivot mount 104 to be minimized. The pivotal displacement of arm 106 into and, most importantly, out of opening 96 is controlled by means of a ratchet-type mechanism that includes a spring-biased releasable trigger 260 forced to engage a ratchet wheel 258 (carried by the same shaft as gear wheels 259) to prevent ratchet wheel 258 and gear wheels 159 from rolling back, unless the trigger is pulled down. This allows roller 102 to be pivoted up into channel 96 to abut against the underside of the group of cables 56, to increase the friction coefficient between drive wheels 72, 74 and cables 58, 60 to help avoid drive wheels from spinning; and once it is forced against cables 58, 60 it may not pivot back down until trigger 260 is actuated. When cable lasher 50 is to be removed from cables 58, 60, the trigger 260 can be actuated to allow roller 102 to be moved away from channel 96.

When both rollers 100, 102 are in their opened position, cables 58, 60 have access to and from channel 96, for installation and removal of cable lasher on and from cables 58, 60. Once cable lasher is installed on cables 58, 60, rollers 100, 102 can be pivoted into their closed position with cables 58, 60 extending through channel 96, with drive wheels 72, 74 resting on cables 58, 60 and with front roller 100 and pressure roller 102 both applying pressure against cables 58, 60 as mentioned above.

Drive mechanism 70 comprises all the electric connections and wiring necessary to connect the different components thereof, as will be obviously to a person skilled in the art.

Cable lasher 50 comprises outer panels that include two side cover panels 108, 110 that are attached to the battery assemblies 86 and a top cover panel 112 that is attached to frame walls 66, 68 and that respectively cover the two sides and the top of carriage 62. Battery packs may be easily removed as required together with side panels 108, 110. The top cover panel 112 includes a handle 114 that allows cable lasher 50 to be carried manually when it is not operatively installed on cables 58, 60. Cover panels 108, 110, 112 have a frontwardly tapered profile to help deflect vegetation that the cable lasher 50 might impact as it rides on cables 58, 60.

Two front cable guide rollers 117, carried by carriage frame 64 are further provided at the cable lasher front end 50a about channel 96 to avoid cables 58, 60 from contacting the edges of the carriage frame 64.

Cables lasher 50 also comprises a lashing apparatus 116, which is the part of cable lasher 50 that accomplishes the actual attachment or lashing of cables 58, 60 to each other, as detailed hereinafter.

Lashing apparatus 116 comprises a lashing apparatus frame 120 that is rotatably attached to carriage frame 64 of carriage 62 by means of a mount interface 118 so as to be rotatable about longitudinal axis L relative to carriage frame 64. Mount interface 118 comprises a bearing support 122 that is fixed to carriage frame 64 and that carries a number of first and second bearings 124, 126 (detailed hereinafter). Bearing support 122 includes a lower opening 123 that is aligned with the opening 98 in carriage frame 64 to allow insertion of cables 58, 60 into channel 96.

A first rail 128 having a partial ring shape is fixed to a rail support plate 129 that is in turn fixed to the lashing apparatus frame 120. Rail 128 engages the first bearings 124 to rotatably carry lashing apparatus 116. More specifically, first bearings 124 each have a flat, cylindrical outer surface that flatly engages a correspondingly flat abutment surface of rail 128. A second rail 132 having a partial ring shape, diametrically smaller than the first rail 128, is also fixed to lashing apparatus frame 120. Second bearings 126 each have a tangentially grooved outer surface that engage a corresponding rib of second rail 132. First bearings 124 are disposed on a slightly larger circular path than that of second bearings 126, such only first bearings 124 engage the first rail 128 and only the second bearings 126 engage the second rail 132. This dual composition of bearings 124, 126 allows to help maintain a stable rotatable engagement of lashing apparatus frame 120 on carriage frame 64: the flat bearings 124 abutting on the flat surface 130 of guide rail 128 allow to maintain a stable radial positioning of lashing apparatus frame 120 relative to carriage frame 64, while the grooved bearings 126 engaging the rib 132 of guide rail 128 allow to maintain a stable axial positioning of lashing apparatus frame 120 relative to carriage frame 64.

The groove and rib engagement of the second bearings and the corresponding second rail could be inverted: the bearing could be ribbed, and the rail, grooved, instead. The second bearings 126 and the second rail 132 could consequently be said to generally have first and second complementary groove and rib members.

Mount interface 118 further comprises a third rail 250 (FIG. 27) carried at the rear end 50b of cable lasher 50, by rear cylindrical wall 151a of carriage frame 64. Third bearings 252 (FIG. 27) that are rotatably mounted to cable lasher frame 120 engage third rail 250, such that lashing apparatus 116 is not cantilevered as it rotates about rear cylindrical wall 151a.

Lashing apparatus frame 120 carries a lashing apparatus gear 134 that has a partial ring shape. Lashing apparatus gear 134 is operatively engaged by a lashing apparatus actuator 136 carried by the carriage frame 64 to rotate the lashing apparatus frame 120 when cable lasher 50 moves along longitudinal axis L. More particularly, lashing apparatus actuator 136 comprises a shaft 138 (FIG. 13) linked on the one hand to gear box 78, and on the other hand to a first actuator gear wheel 140 that is interconnected by means of a belt 142 to a second actuator gear wheel 146. Deviation rollers 144, 148, 150 allow belt 142 to interlink first and second gear wheel 140, 146 while running outside of channel 96. Thus, whenever shaft 138 rotates, first and second gear wheels 140, 146 also rotate and, through their interconnection with lashing apparatus gear 134, so does lashing apparatus 116.

Lashing apparatus frame 120 comprises cover panels collectively referred to with reference number 153, that form the outer shell of lashing apparatus 116.

Lashing apparatus 116 further comprises a first magazine 152 and a second magazine 154 both carried by lashing apparatus frame 120, and each storing a first coil and a second coil of lashing wire 156, 158 that respectively comprise a reserve of the first and a second lashing wires 52, 54. Magazines 152, 154 each comprise a spool 160, 162 having a central hub 164, 166 about which a coil of first and second lashing wires 156, 158 is installed. Spools 160, 162 are rotatably mounted to lashing wire frame 120 as detailed hereinafter. Doors 168, 170 allow access into magazines 152, 154 to replace and/or install therein a new coil of lashing wire 156, 158.

Spools 160, 162 define respective side walls 172, 174 that are ribbed; and the inner surface of doors 168, 170 is also ribbed, to help prevent the individual strands of lashing wires 52, 54 that compose the coils 156, 158 from sliding radially inwardly towards the hubs 164, 166 during use. More particularly, the ribs 176, 178 formed on the spool sides walls 172, 174 and the ribs 180, 182 formed in the inner surface of doors 168, 170 are disposed tangentially and are inclined away from hubs 164, 166 such that lashing wires 52, 54 sliding along side walls 172, 174 or the inner surface of doors 168, 170 would be hindered if they slide towards hubs 164, 166; while not being hindered if they slide away from hubs 164, 166.

This configuration of ribs 176, 178, 180, 182 help lashing wires 52, 54 to remain in their coiled formation 156, 158 while they are in magazines 152, 154, to avoid the outmost strands of lashing wires 52, 54 that are tensioned (as detailed hereinafter) as they are dispensed, from sliding towards hubs 164, 166 and thereafter preventing the normal rotation of spools 160, 162. This is further desirable notably since the lashing wires are usually provided in coils that are laced with tie-wraps (not shown) before they are installed in a cable lasher. The tie-wraps are removed once a new coil 156, 158 is installed inside a magazine 152, 154, which might result in the strands forming coils 156, 158 shifting when they are released. This might allow the outermost strand to slide towards hubs 164, 166 and to thereafter hinder the rotation of spools 160, 162, or even jam spools 160, 162 altogether. The ribbed configuration, and more so the inclined ribbed configuration, of the two side walls of magazines 152, 154 helps prevent this undesirable shifting of the outermost strands of coils 156, 158 towards hubs 164, 166.

Spools 160, 162 are pivotally mounted to lashing apparatus frame 120 by means of spool mounts 184, 186. Only one spool mount 186 for spool 162 will hereafter be described with reference to FIG. 18, but it is understood that the other spool mount 184 for spool 160 has the same structure and function.

Spool mount 186 comprises a central shaft 188 fixedly attached to lashing apparatus frame 120, to which spool hub 166 is rotatably mounted with bearings 190, 192. A spool brake 194 is installed to hinder rotation of spool 162. Spool brake 194 comprises a tension screw 196 that extends through a screw sleeve 198 provided centrally within a hollow in shaft 188. Tension screw 196 can apply adjustable frictional tension against spool hub 166 by means of a pair of tension pins 200, 202 that extend through holes 201, 203 in shaft 188. Tension pins 200, 202 adjustably sandwich a discoid brake pad 204. Brake pad 204 is maintained between an annular shoulder 206 formed within the hollow of hub 166 and bearing 190 and is fixed to prevent rotation thereof relative to frame 120 such that by adjusting the position of tension screw 196 through the hollow of shaft 188, e.g. with a screwdriver, it is possible adjust how much pressure, and consequently how much friction, will be applied by tension pins 200, 202 to break pad disc 204.

The purpose of spool brake 194 is to require a minimal threshold pull force to be deployed on lashing wire 54 to unwind coil 158 and allow lashing wire 54 to be dispensed (as detailed hereinafter). This helps the lashing wire 54 to be taut when it attaches cables 58, 60 (as also detailed hereinafter). This also prevents coil 158 from spontaneously unwinding when the tie-wraps that hold it together are cut away just after a new coil 158 is installed. Indeed, when the tie-wraps are cut away, if spool 162 was free to rotate without restriction, the coil 158 would be free to unwind at least partly as it is released from the tie-wrap, which could result in the outmost free strand possibly digging into coil 158 and becoming jammed when it is thereafter pulled to be dispensed. Spool brake 194 also helps prevent this undesirable effect.

FIGS. 1, 2, 9, 16 and 18 show that a door support arm 208 is hingedly attached at one end to lashing apparatus frame 120 and carries door 170 at its other end by means of a door bearing 209 that allows door 170 to rotate at the end of arm 208. A locking bolt 210 extends through door arm 208 and door 170 to threadingly engage the threaded end of the hollow shaft 188, with arm 208 abutting against a ring 212 carried at the outer end of shaft 188.

Door 170 can consequently move between an opened position (FIGS. 6, 9) in which it is pivoted away from lashing apparatus frame 120 to allow access into magazine 154 to install or remove a lashing wire coil 158 therein; and a closed position (FIGS. 1-5, 7, 8, 16, 18) in which it is releasably attached to shaft 188 but still allowed to rotate, to enclose the coil 158 into magazine 154.

By means of bearing 209, door 170 may rotate together with spool 162 such that door 170 will not hinder the rotation of coil 158 as it unwinds within magazine 154 while lashing wire 54 is dispensed, as detailed hereinafter.

Magazine 154 is consequently defined in the area circumscribed by the spool hub 162, the spool side wall 174, the inner wall of door 170, and a cylindrical magazine panel 214, which is part of the lashing apparatus panels 151. The cylindrical magazine panel 214 defines the radially outward limits of magazine 154.

Lashing apparatus 116 comprises a first and a second lashing wire dispensers 216, 218 for respectively dispending the first and second lashing wires 52, 54 from the first and second magazines 152, 154 about cables 58, 60, as detailed hereinafter. First and second wire dispensers each comprise an opening 220, 222 through lashing apparatus panels 151, including through the cylindrical magazine panels 214, allowing the outermost strand of lashing wires 52, 54 to extend from coils 156, 158 through openings 220, 222 and out towards the cables 58, 60. Each lashing wire dispenser 216, 218 further comprises a set of three guiding rollers 224, 226. When new coils 156, 158 of lashing wires are installed in magazines 152, 154, the tie-wraps that lace them are severed as mentioned above, and then the free extremity of the outermost strands are inserted into and then pulled through openings 220, 222 by passing them alternately over and under the rollers of their sets of rollers 224, 226 as shown in the drawings. Rollers 224, 226 help dispensing lashing wires 52, 54 more smoothly, including helping to prevent them from returning inside magazines 152, 154 due to forced deformation. Doors 168, 170 comprise openings that allow access to a narrow cutting tool, such as cutting pliers, into magazines 152, 154 to allow a user to cut the tie wraps after the doors are closed, to let the lashing wire coils 156, 158 expand within magazines 152, 154 only once doors 168, 170 are closed.

A tow ring 262 (FIG. 27) is provided on pivot mount 104, to allow a lead line to be used to tow lashing apparatus 50 in the case where the autonomous carriage 62 is somehow stuck or malfunctioning such that it is unable to autonomously advance properly along cables 58, 60.

In use, cable lasher 50 is installed by a user to straddle at least one of cables 58, 60. Usually, carrier cable 58 will be specifically used to support cable lasher 50. This installation is made as described partly above, namely, bottom rollers 100, 102 are pivoted in their opened position away from opening 98 of carriage frame 64, to allow cables 58, 60 to enter channel 96. To achieve this, lashing apparatus frame 120 is rotated such that lashing apparatus opening 151b becomes longitudinally aligned with carriage frame opening 98. Carriage 62 then rests on at least one of cables 58, 60 through the abutment of drive wheels 72, 74 thereon.

Coils 156, 158 of lashing wire are installed by a user in the lashing wire magazines 152, 154 as described above, with one strand of each lashing wire 52, 54 extending out through its dispenser 216, 218 such that the free extremity (not shown) of the lashing wire 52, 54 can be attached to the carrier cable with a suitable attachment clamp. Magazine doors 168, 170 are closed and the tie wraps holding the coils together are removed with a cutting tool that is inserted through the magazine door openings. It is noted that the strands of lashing wire 52, 54 will be deformed and tensioned as they are pulled through the rollers of the dispensers 216, 218, and this is desirable to have the lashing wires 52, 54 remain taut.

Once this initial condition of cable lasher 50 is obtained, the user may control cable lasher 50 remotely, e.g. from the ground, with remote control 94 to allow it to move autonomously along cables 58, 60 to attach cables 58, 60 to each other with lashing wires 52, 54. This is achieved by issuing a command from remote control 94 for forward advance of cable lasher 50 along cables 58, 60 by activating motor 76. Upon carriage 62 moving forward, lashing apparatus 116 will simultaneously rotate. Indeed, through gear box 78, motor 76 activates both the drive wheels 72, 74 and the rotation of actuator gear wheels 140, 146 that will in turn rotate the lashing apparatus frame 120. The rotation of lashing apparatus frame 120 means that, as the cable lasher 50 advances along cables 58, 60, the lashing apparatus dispensers 216, 218 will both rotate about cables 58, 60. With one end of the lashing wires 52, 54 being fixed to the carrier cable, this will both pull the lashing wires 52, 54 out of magazines 152, 154 and wind them in a helical pattern about cables 58, 60 to attach them to each other, as suggested sequentially in FIGS. 2 and 3, and further in FIGS. 10 and 11.

The forced deformation of the lashing wires in the rollers 224, 226 will help keep the lashing wires 52, 54 taut at all times with the forced advance of the carriage being sufficiently powerful to counter the resistance that the lashing wires will consequently offer while running through dispensers 216, 218.

According to the present invention, cables lasher 50 comprises an onboard torque compensation mechanism acting on the autonomously movable carriage frame 62 for countering the torque applied thereon through the lashing apparatus 116 by the first and second lashing wires 52, 54 being wound about cables 58, 60. In the present specification, "onboard" means a torque compensation mechanism carried by the cable lasher 50 itself and without a physical link to a ground user, contrarily to a lead line that was used according to the prior art devices. This torque is significant notably because the lashing wires 52, 54 are tensioned considerably through their engagement and deformation through the dispensers 216, 218.

Compensating the torque applied by wires 52, 54 with an onboard torque compensation mechanism is indeed a direct result of the cable lasher being autonomously movable along cables 58, 60: in prior art devices where a lead line was used and the cable lasher was pulled from the ground by a user (or sometimes, pulled horizontally by a user perched on a utility pole), it was not necessary to have an onboard torque compensation mechanism since the lead line pulled by a user would in fact act to compensate the torque. Without a lead line, it becomes useful to compensate the torque applied by the lashing wires 52, 54 to avoid cable lasher 50 from swinging too far as the torque forces it to one side, even going as far as accidentally turning all the way around the cables 58, 60.

In one embodiment, the cable lasher defines a center of mass 230 (see FIGS. 7 and 20) and the onboard torque compensation mechanism comprises an offset position of this center of mass relative to the longitudinal axis L that will induce a center of mass torque $T_M$ in a direction opposite to the lashing wire Torque $T_L$ applied to the cable lasher 50 by the lashing wires 52, 54. While the value of the torques $T_M$ and $T_L$ could be equal in absolute value, in practice they are unlikely to be equal in absolute value, notably because both torque values will depend on the diameter and configuration of the group of cables 56 that varies from one instance to the next.

Figure 24:
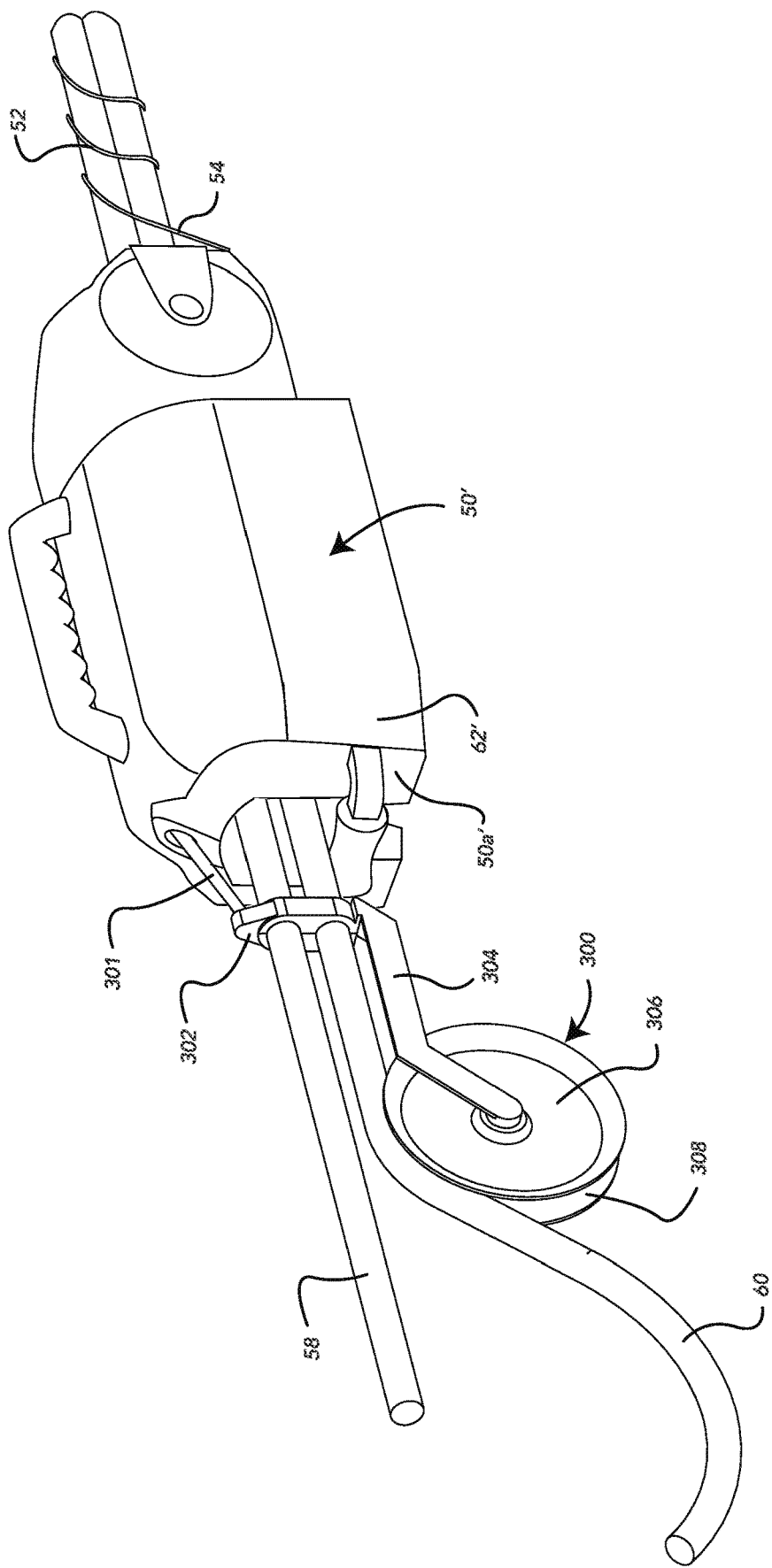
FIGS. 24 and 25 are perspective views respectively showing two other embodiments of cable lashers each equipped with an alternate torque compensation mechanism.

FIG. 24 shows an alternate embodiment of the invention wherein the cable lasher 50' is generally similar to cable lasher 50 of the embodiment shown in FIGS. 1-20, but where the torque compensation mechanism instead includes a front stabilisation device 300. Stabilisation device 300 comprises a support arm 301 attached to frame carriage 62' at the front end 50a' of cable lasher 50. Support arm 301 carries a cable guide 302 that has holes through which the carrier cable 58 and the utility cable 60 (a single utility cable 60 is shown in FIG. 24) extend. A pulley arm 304 is carried by cable guide 302 and carries a pulley 306. The utility cable 60 engages the outer groove 308 of pulley 306. Stabilisation device 301, through the sideways abutment of the groove 308 of pulley 306 against the utility cable 60, will act to resist and at least partly counter the torque applied by first and second lashing wires 52, 54.

Figure 25:
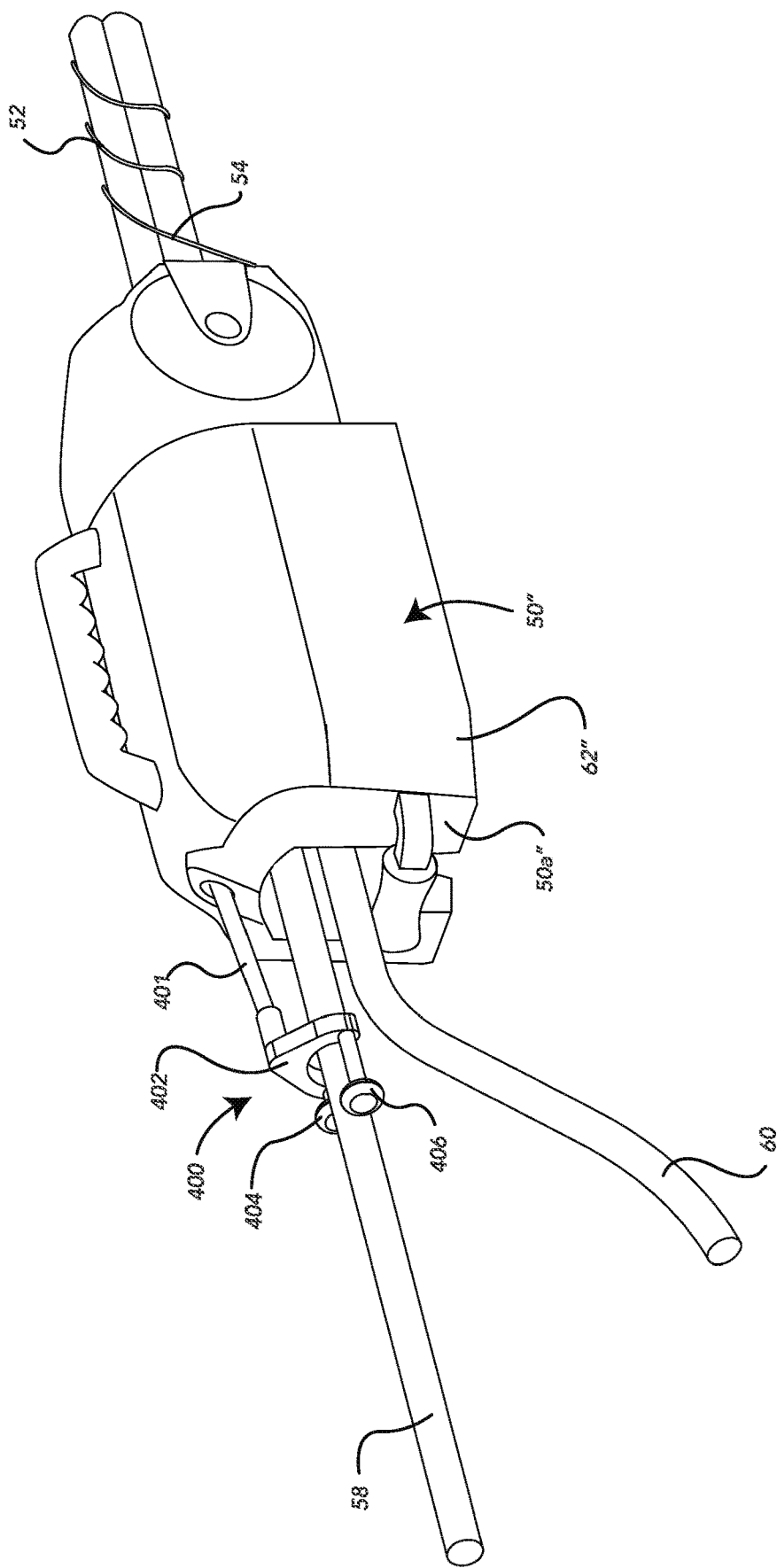
Figure 26:
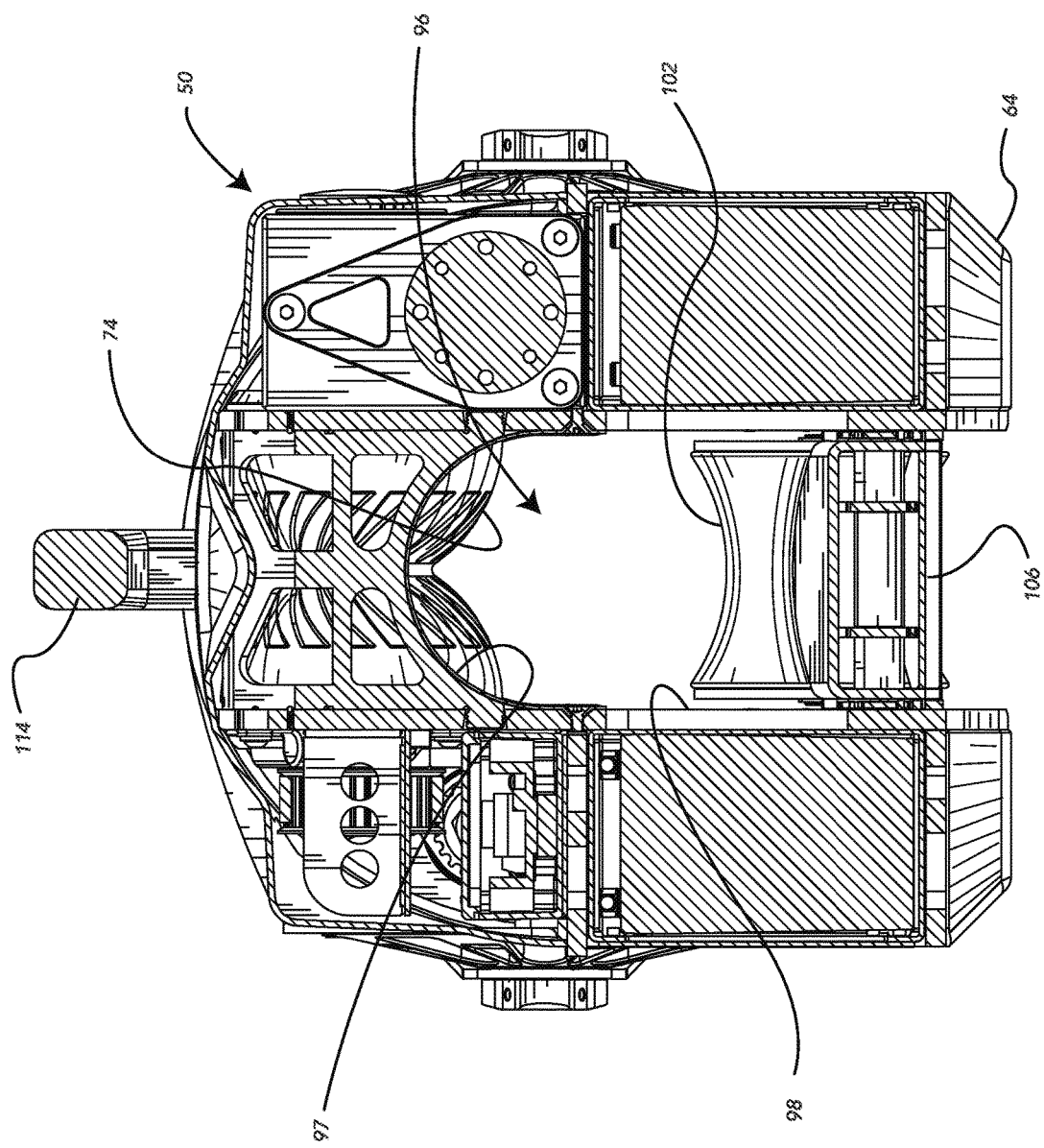
FIGS. 26 and 27 are cross-sectional views respectively taken along lines XXVI and XXVII of FIG. 1.

FIG. 25 shows another alternate embodiment of the invention wherein the cable lasher 50" is generally similar to cable lasher 50 of the embodiment shown in FIGS. 1-20, but where the torque compensation mechanism instead includes a support arm 401 attached to frame carriage 62" at the front end 50a" of cable lasher 50". Support arm 401 carries a bracket 402 that in turn carries a pair of rotatable compensation wheels 404, 406. An actuator (concealed in FIG. 25) rotates compensation wheels 404, 406 whenever the lashing apparatus of the cable lasher 50" is rotated. Compensation wheels 404, 406 engage the carrier cable 58 with their outer periphery. The material used to make compensation wheels 404, 406 combined with a suitably calibrated pressure applied by compensation wheels 404, 406 on carrier cable 58, allow compensation wheels 404, 406 to slide on the surface of carrier cable 58, albeit with enough friction to still impart a compensation wheel torque in a direction opposite the lashing wire torque applied by the lashing wires 52, 54 such that it will at least partly counter the torque applied by first and second lashing wires 52, 54.

Whatever the compensation mechanism that is used, including that of the embodiment of FIGS. 1-20, that of the embodiment of FIG. 24, that of the embodiment of FIG. 25 or that of another embodiment (not shown), its purpose is to at least partly counter the lashing wire torque applied by the lashing wires 52, 54 on the lashing apparatus carriage 62 through lashing apparatus 116. The "lashing wire torque" herein refers to the reaction torque applied by the tension in the lashing wires 52, 54 which is eccentric compared to the center of mass 230 of the cable lasher 50, transferred through the gear system of mount interface 118 to the lashing apparatus carriage 62.

Ideally, the lashing wire torque is entirely countered, but in practice this is difficult—and nearly impossible—to achieve with accuracy, notably since as mentioned above the torque applied by the lashing wires 52, 54 will depend on the diameter of the group of cables 56 being attached to each other. A single lashing machine with a uniform design and configuration is likely to be produced commercially for use on varying groups of cables 56 with respective diameters.

The tow ring 262 (FIG. 27) can be used not only for towing the cable lasher 50 in case of malfunction, but also as a torque compensation mechanism adjustment device, by allowing an inert mass (not shown) to be hung to frame 64. The shape and configuration of this inert mass can be selected to increase or decrease de center of mass torque $T_M$ to adjust to lashing wire torques that vary depending on the diameter of the group of wires 56 being lashed. Carriage 62 defines horizontal and vertical axes H and V (FIG. 7), both orthogonal to each other and orthogonal to longitudinal axis L. Vertical axis V extends centrally within opening 98. Cable lasher 50 further defines a target vertical orientation when riding at least one of cables 58, 60, wherein its vertical axis V would be vertically aligned with this target vertical orientation. This alignment is however rarely, if ever, achieved during use: as cable lasher 50 rides cables 58, 60, it will swing from side to side, notably under the effect of the torque applied by lashing wires 52, 54 on cable lasher 50, even though the torque compensation mechanism helps counter the lashing wire torque; but also as a result of imperfections on the cables being ridden, of vegetation, wind, or other external factors. Aligning the position of vertical axis V of cable lasher 50 with a target vertical orientation is consequently something that is aimed for, and that can be said to be achieved approximately on average.

The center of mass 230 of the cable lasher 50 is located below the point of contact of the drive wheels 72, 74 with the group of cables 58, 60, to increase the stability of cable lasher 50 as it rides on cables 58, 60. Since the exact diameter of the group of cables 56 varies, the position of center of mass 230 can be set to be below horizontal axis H. This, combined with the upward pressure applied by pressure roller 102, contribute to maintain cable lasher 50 in its general vertical orientation and to help avoid carriage 62 from swinging, or worse, from flipping over entirely. The torque compensation mechanism of cable lasher 50 can be further defined as having a laterally offset position of the center of mass 230 of cable lasher 50 relative to the vertical axis V.

The position of center of mass 230 below horizontal axis H combined with the upward pressure applied by pressure roller 102 also contribute to maintain a positive frictional engagement of drive wheels 72, 74 against the one or more cables 58, 60 that they ride, to help avoid drive wheels 72, 74 from spinning.

Cable lasher 50 includes a tilt sensor (concealed in the drawings) carried by carriage frame 64 to detect the angle of carriage 62. The tilt sensor cooperates with drive controller 87 to cut the motor 70 off when a determined threshold angle of carriage 62 is attained, to avoid carriage 62 from flipping over. Incidentally, it has been observed that cutting motor 70 off usually allows carriage 62 to stabilize and return to its target vertical orientation, due to its center of mass 230 being located below the longitudinal axis L. It is noted that the autonomous drive mechanism 70 of cable lasher 50 could comprise more or less that two drive wheel 72, 74, and could alternately comprise any other suitable mechanism that would allow the carriage 62 to move autonomously on and along one or more cables 58, 60.

As shown in FIGS. 21 and 22, according to the present invention, lashing wire dispensers 216, 218 are disposed about longitudinal axis L such that the two lashing wires 52, 54 dispensed thereby apply a radial resultant force component FR on the carriage frame 64 through the lashing apparatus frame 116 that is less than each of the individual force components $F_1$, $F_2$ applied by the two lashing wires 52, 54. Specifically, as the lashing wires 52, 54 are dispensed, lashing wire tension forces $F_1$, $F_2$ is imparted by each of lashing wires 52, 54 to lashing apparatus frame 116 through dispensers 216, 218 and through the gear-and-shaft connexion between motor 70 and lashing apparatus frame 116 described above, to carriage 62. These forces $F_1$, $F_2$ are notably the result of the engagement of the lashing wires 52, 54 through the guiding rollers 224, 226 that will deform the lashing wires and create tension. Spool brakes 194 also increase tension in lashing wires 52, 54. This tension in lashing wires 52, 54 keeps them taut, including when a new lashing wire coil is installed and the tie wraps that hold them are removed.

As shown in FIGS. 21, 22, each force $F_1$, $F_2$ imparted by a can be decomposed into:
a) A longitudinal component (not shown in FIGS. 21, 22) aligned with longitudinal axis L. The longitudinal component of forces $F_1$, $F_2$ is countered by the traction of carriage 62 through wheels 72, 74 when cable lasher 50 advances;
b) A radial component. For the purposes of this explanation, we will sum the radial components of forces $F_1$, $F_2$ and apply the resultant FR at location of longitudinal axis L; and
c) A torque $T_L$ applied about the point where the resultant radial component FR is applied, i.e. about the longitudinal axis L.

When comparing the present invention in FIGS. 21, 22 with the prior art devices in FIGS. 19, 20 where the dispensers are not located on diametrally opposite sides of the group of cables 56, it can be seen that with the disposition of the present invention, the resultant radial component FR of the forces applied to carriage 62 will counter each other significantly, such that the intensity of the resultant force FR will be as small as possible, and less than the radial component of forces $F_1$ or $F_2$ taken alone; contrarily to the prior devices where the resultant radial component FR is be greater than the radial component of each individual force $F_1$ and $F_2$.

Lashing apparatus actuator 136 actuates the lashing apparatus frame 120 directly without acting on the at least two lashing wire dispensers 216, 218. That is to say, the lashing apparatus actuator 136 is mounted to the carriage frame and acts directly to rotate the lashing apparatus frame 120. In some prior art non-autonomous cable lashers, the lashing apparatus frame rotates as a result of the lashing wires being dispensed: more particularly, the lashing wire dispensers are part of the lashing apparatus actuator to rotate the lashing apparatus frame through the lashing wires being pulled out. This is a problem, since (a) it increases the mass of the lashing apparatus frame and (b) it increase the torque ultimately transferred to the carriage frame 64. The present inventive cable lasher, on the other hand, has a low-mass lashing apparatus 116, this low mass being notably enabled by the lashing actuator 136 being provided on the carriage frame 64 and acting directly on the lashing apparatus frame 120 instead, without the dispensers 216, 218 being used to rotate the lashing apparatus frame 120 at all.

In one embodiment (not shown), where there might more than two lashing wires dispensed by the cable lasher, the more than two lashing wire dispensers are disposed at generally equiangular positions about the longitudinal axis.

For instance, in the embodiment shown in the drawings where there are two lashing wires, the two dispensers are located at about 180° from each other. If there are three, the three dispensers would be located at about 120° from each other.

It is noted that while the lashing wires 52, 54 are shown to be conveniently stored in respective lashing wire magazines 152, 154, in an alternate embodiment (not shown) they could be stored in a same magazine but still dispensed distinctly from each other.

The invention claimed is:

1. An autonomous cable lasher for winding a first lashing wire around a number of cables to attach the cables to each other, comprising:
   a carriage defining a longitudinal axis, the carriage for riding at least one of the cables in
      a direction that is generally aligned with the longitudinal axis, comprising:
      a carriage frame;
      a drive mechanism carried by the carriage frame, for autonomously driving the carriage frame along the at least one of the cables;
      a power source for powering the drive mechanism; and
      a drive controller that controls the drive mechanism;
   a lashing apparatus comprising:
      a lashing apparatus frame rotatably mounted to the carriage frame and rotatable about the longitudinal axis relative to the carriage frame;
      a first magazine carried by the lashing apparatus frame, for carrying a reserve of the first lashing wire therein; and
      a first dispenser carried by the lashing apparatus frame, for dispending the first lashing wire from the first magazine about the cables in a helical winding pattern as the cable lasher moves along the longitudinal axis and the lashing apparatus frame rotates, to attach the cables to each other;
   a channel for receiving the cables, about which the carriage frame and the lashing apparatus frame are disposed and extending along the longitudinal axis;
   a lashing apparatus actuator that rotates the lashing apparatus frame relative to the carriage frame when the cable lasher moves along the longitudinal axis; and
   an onboard torque compensation mechanism acting on the carriage frame to apply a force that counters a lashing wire torque applied on the carriage frame through the lashing apparatus by the first lashing wire being wound about the cables, wherein the onboard torque compensation mechanism prevents the carriage from rotating around the cables.

2. The cable lasher as defined in claim 1, wherein the onboard torque compensation mechanism prevents the carriage from turning all the way around the cables.

3. The cable lasher as defined in claim 1, wherein the cable lasher defines a center of mass and the onboard torque compensation mechanism comprises an offset position of the center of mass relative to the longitudinal axis that will, through gravity, induce a center of mass torque about the longitudinal axis in a direction that is opposite to the lashing wire torque.

4. The cable lasher as defined in claim 3, wherein the carriage defines a vertical orientation that represents an average expected alignment of the carriage with a vertical plane extending through the longitudinal axis, with the center of mass further being located to one side of the vertical plane when the carriage is in the vertical orientation.

5. The cable lasher as defined in claim 4, wherein the center of mass is further below a horizontal plane extending through the frame's longitudinal axis when the carriage is in the vertical orientation.

6. The cable lasher as defined in claim 1, wherein the drive mechanism comprises at least one drive wheel rotatably mounted to the carriage frame for engaging the at least one of the cables, and a motor carried by the carriage frame for rotating the drive wheel.

7. The cable lasher as defined in claim 1, wherein the power sources comprise a motor and the drive controller comprises a remote controller capable of wireless transmission with a transceiver carried by the carriage frame and connected to the motor.

8. The cable lasher as defined in claim 1, wherein the power source comprises a motor and batteries carried by the carriage frame for powering the motor.

9. The cable lasher as defined in claim 1, wherein the lashing apparatus further comprises:
   a second magazine carried by the lashing apparatus frame, for carrying a reserve of a second lashing wire therein; and
   a second dispenser for dispending the second lashing wire from the second magazine about the cables in a helical winding pattern as the cable lasher moves along the longitudinal axis and the lashing apparatus frame rotates to further attach, together with the first lashing wire, the cables to each other;
   wherein the onboard torque compensation mechanism acting on the carriage frame at least partially counters the lashing wire torque which is applied on the carriage frame through the lashing apparatus by both the first and second lashing wires being wound about the cables.

10. The cable lasher as defined in claim 1, wherein the lashing apparatus comprises a spool carrying a coil comprising a reserve of the lashing wire, the spool being rotatably mounted to the lashing apparatus frame.

11. The cable lasher as defined in claim 10, wherein the lashing apparatus comprises a spool brake for restricting, but not preventing, the rotation of the spool.

12. The cable lasher as defined in claim 10, wherein the spool comprises ribs for helping to prevent the lashing wire from accidentally sliding through the coil towards a rotational axis of the spool.

13. The cable lasher as defined in claim 1, wherein the lashing apparatus frame is rotatably mounted to the carriage frame by means of a mount interface that comprises at least one rail fixed to one of the lashing apparatus frame and the carriage frame, and a group of bearings fixed to the other one of the lashing apparatus frame and the carriage frame, with the group of bearings engaging the at least one rail for mounting the lashing apparatus frame to the carriage frame while allowing rotation of the lashing apparatus frame relative to the carriage frame.

14. The cable lasher as defined in claim 13, wherein the at least one rail comprises a first rail and a second rail, and the group of bearings comprises:
   first bearings that have a flat, cylindrical outer surface that flatly engages the first rail, to help maintain a stable radial engagement of the lashing apparatus frame on the carriage frame; and
   second bearings, with the second bearings and the second rail respectively having first and second complementary groove and rib members that engage each other, to help maintain a stable axial engagement of the lashing apparatus frame relative to the carriage frame.

15. A cable lasher comprising:
   an autonomous carriage for moving along cables to be attached to each other;
   a lashing apparatus rotatably mounted to the carriage and capable of dispensing a lashing wire about the cables in a helical winding pattern as the cable lasher moves along a longitudinal axis and the lashing apparatus rotates to attach the cables to each other;
   a channel for receiving the cables, about which the carriage and the lashing apparatus are disposed and extending along the longitudinal axis;
   a lashing apparatus actuator carried by the carriage that rotates the lashing apparatus when the cable lasher moves along the longitudinal axis;
   an onboard power source carried by said carriage for powering the advance of the carriage and the rotation of the lashing apparatus; and
   an onboard torque compensation mechanism acting on the autonomous carriage to apply a force that counters a lashing wire torque applied on the carriage through the lashing apparatus by the lashing wire being wound about the cables, wherein the onboard torque compensation mechanism prevents the carriage from rotating around the cables.

16. An autonomous cable lasher for winding a first lashing wire around a number of cables to attach the cables to each other, comprising:
   a carriage defining a longitudinal axis, the carriage for riding at least one of the cables in a direction that is generally aligned with the longitudinal axis, comprising:
      a carriage frame;
      a drive mechanism carried by the carriage frame, for autonomously driving the carriage frame along the at least one of the cables;
      a power source for powering the drive mechanism; and
      a drive controller that controls the drive mechanism;
   a lashing apparatus comprising:
      a lashing apparatus frame rotatably mounted to the carriage frame and rotatable about the longitudinal axis relative to the carriage frame;
      a first magazine carried by the lashing apparatus frame, for carrying a reserve of the first lashing wire therein; and
      a first dispenser carried by the lashing apparatus frame, for dispensing the first lashing wire from the first magazine about the cables in a helical winding pattern as the cable lasher moves along the longitudinal axis and the lashing apparatus frame rotates, to attach the cables to each other;
   a channel for receiving the cables, about which the carriage frame and the lashing apparatus frame are disposed and extending along the longitudinal axis;
   a lashing apparatus actuator that rotates the lashing apparatus frame relative to the carriage frame when the cable lasher moves along the longitudinal axis; and
   an onboard torque compensation mechanism acting on the carriage frame to apply a force that at least partly counters a lashing wire torque applied on the carriage frame through the lashing apparatus by the first lashing wire being wound about the cables, wherein the cable lasher defines a center of mass and the onboard torque compensation mechanism comprises an offset position of the center of mass relative to the longitudinal axis that will, through gravity, induce a center of mass torque about the longitudinal axis in a direction that is opposite to the lashing wire torque, wherein the carriage defines a vertical orientation that represents an average expected alignment of the carriage with a vertical plane extending through the longitudinal axis, with the center of mass further being located to one side of the vertical plane when the carriage is in the vertical orientation.

* * * * *